(12) United States Patent
Mahmoud Shakib Roshdy et al.

(10) Patent No.: US 12,463,592 B2
(45) Date of Patent: Nov. 4, 2025

(54) ACTIVE MIXERS WITH ENHANCED IMAGE REJECTION RATIO (IRR)

(71) Applicant: QUALCOMM Incorporated, San Diego, CA (US)

(72) Inventors: Sherif Mahmoud Shakib Roshdy, San Diego, CA (US); Jeremy Darren Dunworth, La Jolla, CA (US); Jorge Garcia, San Diego, CA (US); Paul Brian Sheehy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 18/340,796

(22) Filed: Jun. 23, 2023

(65) Prior Publication Data
US 2024/0429867 A1    Dec. 26, 2024

(51) Int. Cl.
*H03B 5/24* (2006.01)
*H03C 3/00* (2006.01)
*H03D 7/12* (2006.01)

(52) U.S. Cl.
CPC ............... *H03D 7/12* (2013.01); *H03B 5/24* (2013.01)

(58) Field of Classification Search
None
See application file for complete search history.

(56) References Cited

U.S. PATENT DOCUMENTS

| | | | |
|---|---|---|---|
| 6,750,719 B2* | 6/2004 | Toyota | H03G 1/0023 330/296 |
| 7,324,787 B2* | 1/2008 | Kurakami | H03G 3/3047 375/302 |
| 7,570,710 B1 | 8/2009 | Fortier et al. | |
| 8,787,864 B2 | 7/2014 | Leung et al. | |
| 9,154,079 B2 | 10/2015 | Zhuo et al. | |
| 9,287,906 B2* | 3/2016 | Yamanouchi | H04B 1/0475 |
| 10,193,497 B2 | 1/2019 | Yu et al. | |
| 2002/0167369 A1* | 11/2002 | Yamaji | H03D 7/165 332/103 |

(Continued)

FOREIGN PATENT DOCUMENTS

EP    1652292 B1    10/2008

OTHER PUBLICATIONS

International Search Report and Written Opinion—PCT/US2024/032473—ISA/EPO—Sep. 26, 2024.

(Continued)

*Primary Examiner* — Pablo N Tran
(74) *Attorney, Agent, or Firm* — Smith Tempel Blaha LLC/Qualcomm Incorporated

(57) ABSTRACT

A communication system includes a passive quadrature generator connected directly to an in-phase (I) mixer and a quadrature (Q) mixer, an I LO amplitude detect circuit connected to the passive quadrature generator and connected to the I mixer, and a Q LO amplitude detect circuit connected to the passive quadrature generator and connected to the Q mixer, the I LO amplitude detect circuit configured to detect an I LO amplitude and the Q LO amplitude detect circuit configured to detect a Q LO amplitude, and a combining and integrating circuit configured to receive the detected I LO amplitude and the detected Q LO amplitude and generate an I LO DC bias voltage to bias the I mixer and a Q LO DC bias voltage to bias the Q mixer.

29 Claims, 17 Drawing Sheets

(56) References Cited

U.S. PATENT DOCUMENTS

| | | | |
|---|---|---|---|
| 2005/0176388 A1* | 8/2005 | Yamawaki | H03F 3/24 |
| | | | 455/116 |
| 2005/0226352 A1 | 10/2005 | Kasperkovitz | |
| 2009/0174456 A1* | 7/2009 | Yanagisawa | H04B 1/30 |
| | | | 327/307 |
| 2011/0243287 A1* | 10/2011 | Kitsunezuke | H04B 1/28 |
| | | | 455/296 |
| 2012/0164966 A1* | 6/2012 | Casagrande | H04L 27/14 |
| | | | 455/318 |
| 2014/0348266 A1* | 11/2014 | Yamanouchi | H04B 1/0475 |
| | | | 375/297 |
| 2021/0099230 A1* | 4/2021 | Nishioka | H04B 10/2575 |

OTHER PUBLICATIONS

Yong G.S.K., et al., "A Wideband Quadrature Generator IC Using a Varactor-Compensated Feedback Network", Analog Integrated Circuits and Signal Processing (2010), Kluwer Academic Publishers, BO, vol. 63, No. 2, Oct. 20, 2009, pp. 161-167, XP019786431, figures 1, 2.

* cited by examiner

ACTIVE MIXERS WITH ENHANCED IMAGE REJECTION RATIO (IRR)

FIELD

The present disclosure relates generally to electronics, and more specifically to mixers used in a transceiver.

BACKGROUND

Wireless communication devices and technologies are becoming ever more prevalent, as are communication devices that operate at millimeter-wave (mmW) and sub-terahertz (subTHz) frequencies. Wireless communication devices generally transmit and/or receive communication signals. In a radio frequency (RF) transceiver, a communication signal is typically amplified and transmitted by a transmit section and a received communication signal is amplified and processed by a receive section. A transceiver for communication in 5G and 6G applications may communicate using millimeter wave (mmW) frequency signals and sub-THz frequencies and may use what is referred to as a zero intermediate frequency (ZIF) architecture or a low-IF architecture.

A ZIF architecture is one where a baseband information signal is upconverted directly to a radio frequency (RF) signal for transmission and a received RF signal is down-converted directly to baseband.

Spectrally efficient modulation schemes (such as 16 quadrature amplitude modulation (16QAM) and (64QAM) use In-phase (I) and quadrature (Q) (IQ) mixers and local oscillator (LO) generation circuitry to modulate and upconvert/downconvert the communication signal.

A ZIF architecture has a number of advantages at mmWave and sub-THz frequencies particularly when multiple RF frequencies are processed. However, a ZIF architecture also has drawbacks including an image rejection ratio (IRR) that may degrade signal quality and EVM (error vector magnitude) due to IQ errors in the mixer and in the LO generation circuitry. For example, at sub-THz frequencies, for a ZIF receiver, a post-factory calibration IRR ($IRR_{cal}$) specification may be greater than 40 dB. To reach such an $IRR_{cal}$ specification at sub-THz frequencies, an example pre-calibration IRR ($IRR_0$) specification could be at least 25 dB. Such IRR specifications can be difficult to achieve at mmWave and sub-THz frequencies.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a communication system including a passive quadrature generator connected directly to an in-phase (I) mixer and a quadrature (Q) mixer, an I LO amplitude detect circuit connected to the passive quadrature generator and connected to the I mixer, and a Q LO amplitude detect circuit connected to the passive quadrature generator and connected to the Q mixer, the I LO amplitude detect circuit configured to detect an I LO amplitude and the Q LO amplitude detect circuit configured to detect a Q LO amplitude, and a combining and integrating circuit configured to receive the detected I LO amplitude and the detected Q LO amplitude and generate an I LO DC bias voltage to bias the I mixer and a Q LO DC bias voltage to bias the Q mixer.

Another aspect of the disclosure provides a method for mixing signals including detecting an in phase (I) LO amplitude and a quadrature (Q) LO amplitude, generating an I LO DC bias voltage from the I LO amplitude, generating a Q LO DC bias voltage from the Q LO amplitude, and applying the I LO DC bias voltage to an I mixer and applying the Q LO DC bias voltage to a Q mixer to improve the image rejection ratio (IRR) of the I mixer and the Q mixer.

Another aspect of the disclosure provides a device for signal mixing including means for detecting an in phase (I) LO amplitude and a quadrature (Q) LO amplitude, means for generating an I LO DC bias voltage from the I LO amplitude, means for generating a Q LO DC bias voltage from the Q LO amplitude, and means for applying the I LO DC bias voltage to an I mixer and means for applying the Q LO DC bias voltage to a Q mixer to improve the image rejection ratio (IRR) of the mixer.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

DETAILED DESCRIPTION

Figure 1:
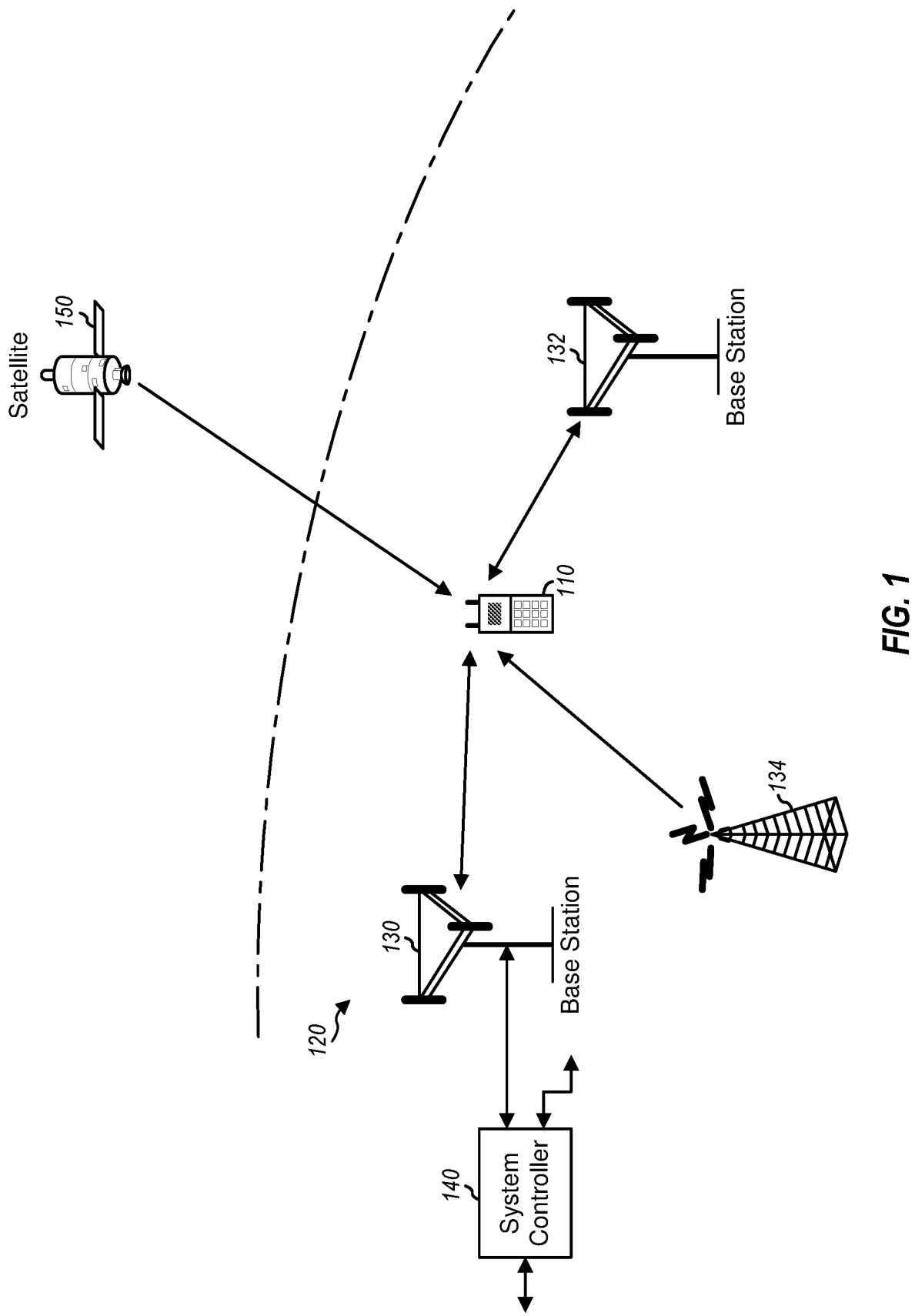
FIG. 1 is a diagram showing a wireless device communicating with a wireless communication system.

The word "exemplary" is used herein to mean "serving as an example, instance, or illustration." Any aspect described herein as "exemplary" is not necessarily to be construed as preferred or advantageous over other aspects.

In a communication device transceiver, one or more mmW frequency signals and sub-THz frequency signals may be upconverted and downconverted using a local oscillator (LO) signal.

At mmWave and sub-THz communication frequencies, an efficient IQ LO generation circuit may use a voltage controlled oscillator (VCO) operating at a carrier frequency, $f_{carrier}/N$ with xN frequency multiplier and a passive 0°/90° phase shifter to generate the I and Q LO signals. Typical values for the frequency multiplier N are 3, 4, 6, 8 and 9.

In a communication device transceiver, signal upconversion and signal downconversion may occur using a direct conversion architecture, e.g., one using a low IF (LIF), or a zero IF (ZIF) architecture. In a communication device transceiver using a direct conversion architecture, e.g., one using a low IF (LIF), or a zero IF (ZIF) and operating at millimeter wave (mmW) frequencies or sub THz frequencies, the local oscillator (LO) signal that is used for signal upconversion and signal downconversion appears at very high frequencies, on the order of tens of gigahertz (GHz) up to 300 GHz. It is difficult at these RF frequencies to provide mixer conversion gain and phase matching to meet the desired image rejection allocated in the error vector magnitude (EVM) budget, which sets a maximum spectral efficiency for the communication signal.

Exemplary embodiments of the disclosure improve a mixer's rejection of IQ LO imbalance and hence pre-cal $IRR_0$ in the presence of IQ LO imbalance.

Exemplary embodiments of the disclosure enable the $IRR_0$ level needed for calibration-free 16QAM modulation at sub-THz frequencies. With calibration, 64QAM can be supported. If 64QAM is not standard in sub-THz bands, exemplary embodiments of the disclosure can eliminate mixer IRR calibration.

Exemplary embodiments of the disclosure reduce the total silicon area (area of the mixer and the LO path) by allowing a quadrature hybrid (QH) to be connected directly to the mixer switching core without impedance matching or inductors to resonate FET capacitances.

Exemplary embodiments of the disclosure limit the quadrature hybrid phase imbalance by using termination resistors that de-sensitize the quadrature hybrid to reactive loading that can be caused by the mixer FET capacitances.

Exemplary embodiments of the disclosure provide independent in phase and quadrature signal feedback loops to reduce FET capacitance variation at large LO swing voltages by creating a fixed average drain current on the mixer FETs.

In an exemplary embodiment, a real-time analog technique to compensate for local oscillator IQ errors in a ZIF receiver to an uncalibrated IRR of up to approximately 25 dB for mmWave and sub-THz communications systems is disclosed.

Exemplary embodiments of the disclosure control bias currents to cause an operating point of the IQ mixer to remain constant over the LO frequency range; and reject imbalances that inherently exist between LO signals going to I and Q sides of the mixer using a passive IQ LO quadrature hybrid structure.

FIG. 1 is a diagram showing a wireless device 110 communicating with a wireless communication system 120. The wireless communication system 120 may be a Long Term Evolution (LTE) system, a Code Division Multiple Access (CDMA) system, a Global System for Mobile Communications (GSM) system, a wireless local area network (WLAN) system, a 5G NR (new radio) system, or some other wireless system. A CDMA system may implement Wideband CDMA (WCDMA), CDMA 1x, Evolution-Data Optimized (EVDO), Time Division Synchronous CDMA (TD-SCDMA), or some other version of CDMA. For simplicity, FIG. 1 shows wireless communication system 120 including two base stations 130 and 132 and one system controller 140. In general, a wireless communication system may include any number of base stations and any set of network entities.

The wireless device 110 may also be referred to as a user equipment (UE), a mobile station, a terminal, an access terminal, a subscriber unit, a station, etc. Wireless device 110 may be a cellular phone, a smartphone, a tablet, a wireless modem, a personal digital assistant (PDA), a handheld device, a laptop computer, a smartbook, a netbook, a tablet, a cordless phone, a medical device, an automobile, a device configured to connect to one or more other devices (for example through the internet of things), a wireless local loop (WLL) station, a Bluetooth device, etc. Wireless device 110 may communicate with wireless communication system 120. Wireless device 110 may also receive signals from broadcast stations (e.g., a broadcast station 134) and/or may communicate with satellites (e.g., a satellite 150 in one or more global navigation satellite systems (GNSS)), or a satellite that can receive signals from the wireless device 110, etc.). Wireless device 110 may support one or more radio technologies for wireless communication such as LTE, WCDMA, CDMA 1x, EVDO, TD-SCDMA, GSM, 802.11, 802.15, 5G, Sub6 5G, 6G, UWB, etc.

Wireless device 110 may support carrier aggregation, for example as described in one or more LTE or 5G standards. In some embodiments, a single stream of data is transmitted over multiple carriers using carrier aggregation, for example as opposed to separate carriers being used for respective data streams. Wireless device 110 may be able to operate in a variety of communication bands including, for example, those communication bands used by LTE, WiFi, 5G or other communication bands, over a wide range of frequencies. Wireless device 110 may also be capable of communicating directly with other wireless devices without communicating through a network.

In general, carrier aggregation (CA) may be categorized into two types—intra-band CA and inter-band CA. Intra-band CA refers to operation on multiple carriers within the same band. Inter-band CA refers to operation on multiple carriers in different bands.

Figure 2A:
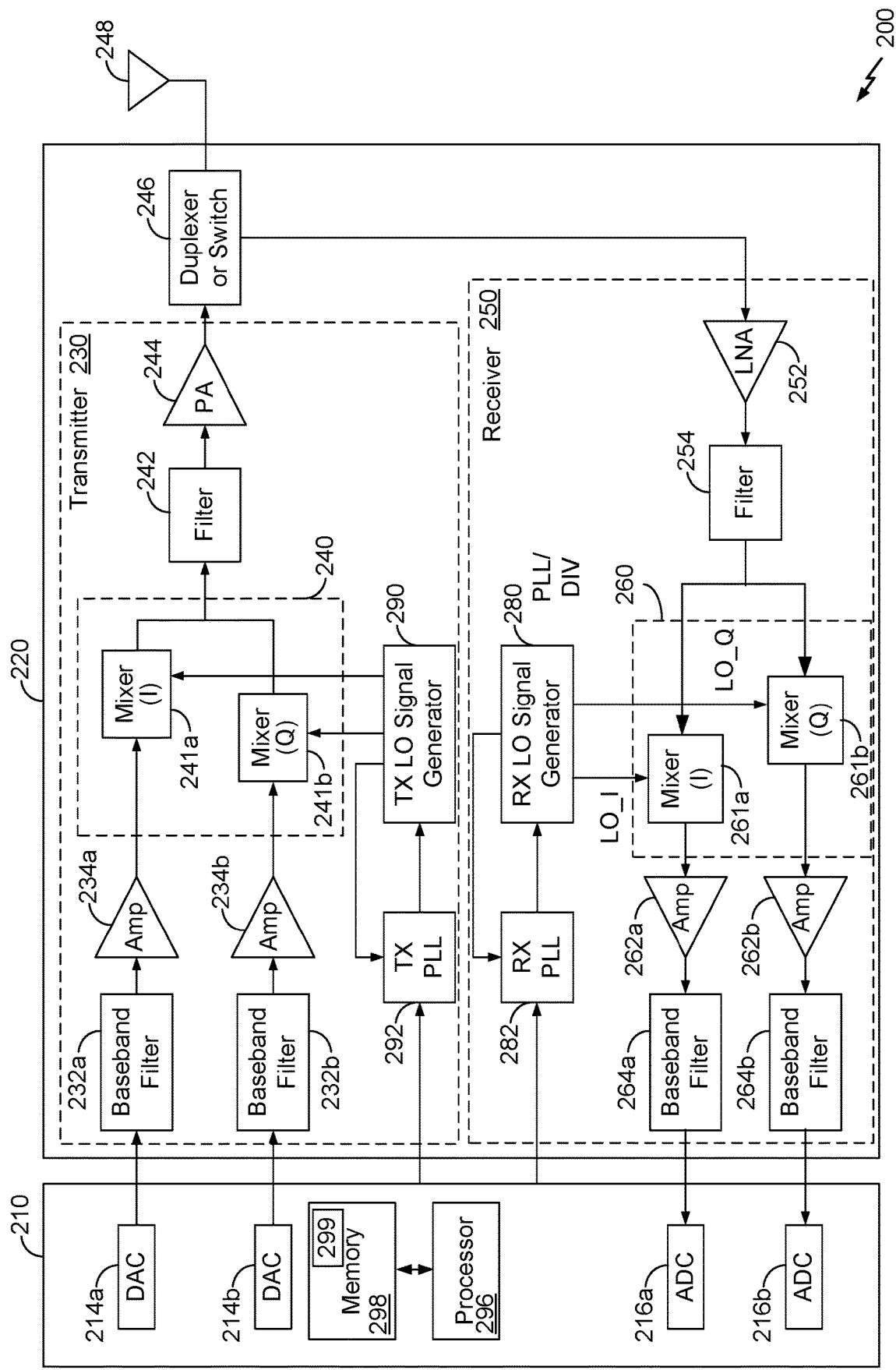
FIG. 2A is a block diagram showing a wireless device in which exemplary techniques of the present disclosure may be implemented.

FIG. 2A is a block diagram showing a wireless device 200 in which exemplary techniques of the present disclosure may be implemented. The wireless device 200 may, for example, be an embodiment of the wireless device 110 illustrated in FIG. 1.

FIG. 2A shows an example of a transceiver 220 having a transmitter 230 and a receiver 250. In general, the conditioning of the signals in the transmitter 230 and the receiver 250 may be performed by one or more stages of amplifier, filter, upconverter, downconverter, etc. These circuit blocks may be arranged differently from the configuration shown in FIG. 2A. Furthermore, other circuit blocks not shown in FIG. 2A may also be used to condition the signals in the transmitter 230 and receiver 250. Unless otherwise noted, any signal in FIG. 2A, or any other figure in the drawings, may be either single-ended or differential. Some circuit blocks in FIG. 2A may also be omitted.

In the example shown in FIG. 2A, wireless device 200 generally comprises the transceiver 220 and a data processor 210. The data processor 210 may include a processor 296 operatively coupled to a memory 298. The memory 298 may be configured to store data and program codes shown generally using reference numeral 299, and may generally comprise analog and/or digital processing components. The processor 296 and the memory 298 may cooperate to control, configure, program, or otherwise fully or partially control some or all of the operation of the embodiments of the TX LO leakage calibration circuit described herein.

The transceiver 220 includes a transmitter 230 and a receiver 250 that support bi-directional communication. In general, wireless device 200 may include any number of transmitters and/or receivers for any number of communication systems and frequency bands. All or a portion of the transceiver 220 may be implemented on one or more analog integrated circuits (ICs), RF ICs (RFICs), mixed-signal ICs, etc.

A transmitter or a receiver may be implemented with a super-heterodyne architecture or a direct-conversion architecture. In the super-heterodyne architecture, a signal is frequency-converted between radio frequency (RF) and baseband in multiple stages, e.g., from RF to an intermediate frequency (IF) in one stage, and then from IF to baseband in another stage for a receiver. In the direct-conversion architecture, a signal is frequency converted between RF and baseband in one stage. The super-heterodyne and direct-conversion architectures may use different circuit blocks and/or have different requirements. In the example shown in FIG. 2A, transmitter 230 and receiver 250 are implemented with the direct-conversion architecture.

In the transmit path, the data processor 210 processes data to be transmitted and provides in-phase (I) and quadrature (Q) analog output signals to the transmitter 230. In an exemplary embodiment, the data processor 210 includes digital-to-analog-converters (DAC's) 214a and 214b for converting digital signals generated by the data processor 210 into the I and Q analog output signals, e.g., I and Q output currents, for further processing. In other embodiments, the DACs 214a and 214b are included in the transceiver 220 and the data processor 210 provides data (e.g., for I and Q) to the transceiver 220 digitally.

Within the transmitter 230, baseband (e.g., lowpass) filters 232a and 232b filter the I and Q analog transmit signals, respectively, to remove undesired aliases (also sometimes called images) caused by the prior digital-to-analog conversion. Amplifiers (Amp) 234a and 234b amplify the signals from baseband filters 232a and 232b, respectively, and provide I and Q baseband signals. An upconverter 240 having upconversion mixers 241a and 241b upconverts the I and Q baseband signals with I and Q transmit (TX) local oscillator (LO) signals from a TX LO signal generator 290 and provides an upconverted signal. A filter 242 filters the upconverted signal to remove undesired mixing products caused by the frequency upconversion as well as noise in a receive frequency band. A power amplifier (PA) 244 amplifies the signal from filter 242 to obtain the desired output power level and provides a transmit RF signal. The transmit RF signal may be routed through a duplexer or switch 246 and transmitted via an antenna 248. While examples discussed herein utilize I and Q signals, those of skill in the art will understand that components of the transceiver may be configured to utilize polar modulation.

In the receive path, antenna 248 receives communication signals and provides a received RF signal, which may be routed through duplexer or switch 246 and provided to a low noise amplifier (LNA) 252. The duplexer 246 is designed to operate with a specific RX-to-TX duplexer frequency separation, such that RX signals are isolated from TX signals. The received RF signal is amplified by LNA 252 and filtered by a filter 254 to obtain a desired RF input signal. Downconversion mixers 261a and 261b in a downconverter 260 mix the output of filter 254 with I and Q receive (RX) LO signals (i.e., LO_I and LO_Q) from an RX LO signal generator 280 to generate I and Q baseband signals. The I and Q baseband signals are amplified by amplifiers 262a and 262b and further filtered by baseband (e.g., low-pass) filters 264a and 264b to obtain I and Q analog input signals, which are provided to data processor 210. In the exemplary embodiment shown, the data processor 210 includes analog-to-digital-converters (ADC's) 216a and 216b for converting the analog input signals into digital signals to be further processed by the data processor 210. In some embodiments, the ADCs 216a and 216b are included in the transceiver 220 and provide data to the data processor 210 digitally.

In FIG. 2A, TX LO signal generator 290 generates the I and Q TX LO signals used for frequency upconversion, while RX LO signal generator 280 generates the I and Q RX LO signals used for frequency downconversion. Each LO signal is a periodic signal with a particular fundamental frequency. A phase locked loop (PLL) 292 receives timing information from data processor 210 and generates a control signal used to adjust the frequency and/or phase of the TX LO signals from LO signal generator 290. Similarly, a PLL 282 receives timing information from data processor 210 and generates a control signal used to adjust the frequency and/or phase of the RX LO signals from LO signal generator 280.

Wireless device 200 may support CA and may (i) receive multiple downlink signals transmitted by one or more cells on multiple downlink carriers at different frequencies and/or (ii) transmit multiple uplink signals to one or more cells on multiple uplink carriers. Those of skill in the art will understand, however, that aspects described herein may be implemented in systems, devices, and/or architectures that do not support carrier aggregation.

Certain components of the transceiver 220 are functionally illustrated in FIG. 2A, and the configuration illustrated therein may or may not be representative of a physical device configuration in certain implementations. For example, as described above, transceiver 220 may be implemented in various integrated circuits (ICs), RF ICs (RFICs), mixed-signal ICs, etc. In some embodiments, the transceiver 220 is implemented on a substrate or board such as a printed circuit board (PCB) having various modules, chips, and/or components. For example, the power amplifier 244, the filter 242, and the duplexer 246 may be implemented in separate modules or as discrete components, while the remaining components illustrated in the transceiver 220 may be implemented in a single transceiver chip.

The power amplifier 244 may comprise one or more stages comprising, for example, driver stages, power amplifier stages, or other components, that can be configured to amplify a communication signal on one or more frequencies, in one or more frequency bands, and at one or more power levels. Depending on various factors, the power amplifier 244 can be configured to operate using one or more driver stages, one or more power amplifier stages, one or more impedance matching networks, and can be configured to provide good linearity, efficiency, or a combination of good linearity and efficiency.

In an exemplary embodiment in a super-heterodyne architecture, the PA 244 and LNA 252 (and filter 242 and filter 254 in some examples) may be implemented separately from other components in the transmitter 230 and receiver 250, for example on a millimeter wave integrated circuit. An example super-heterodyne architecture is illustrated in FIG. 2B.

Figure 2B:
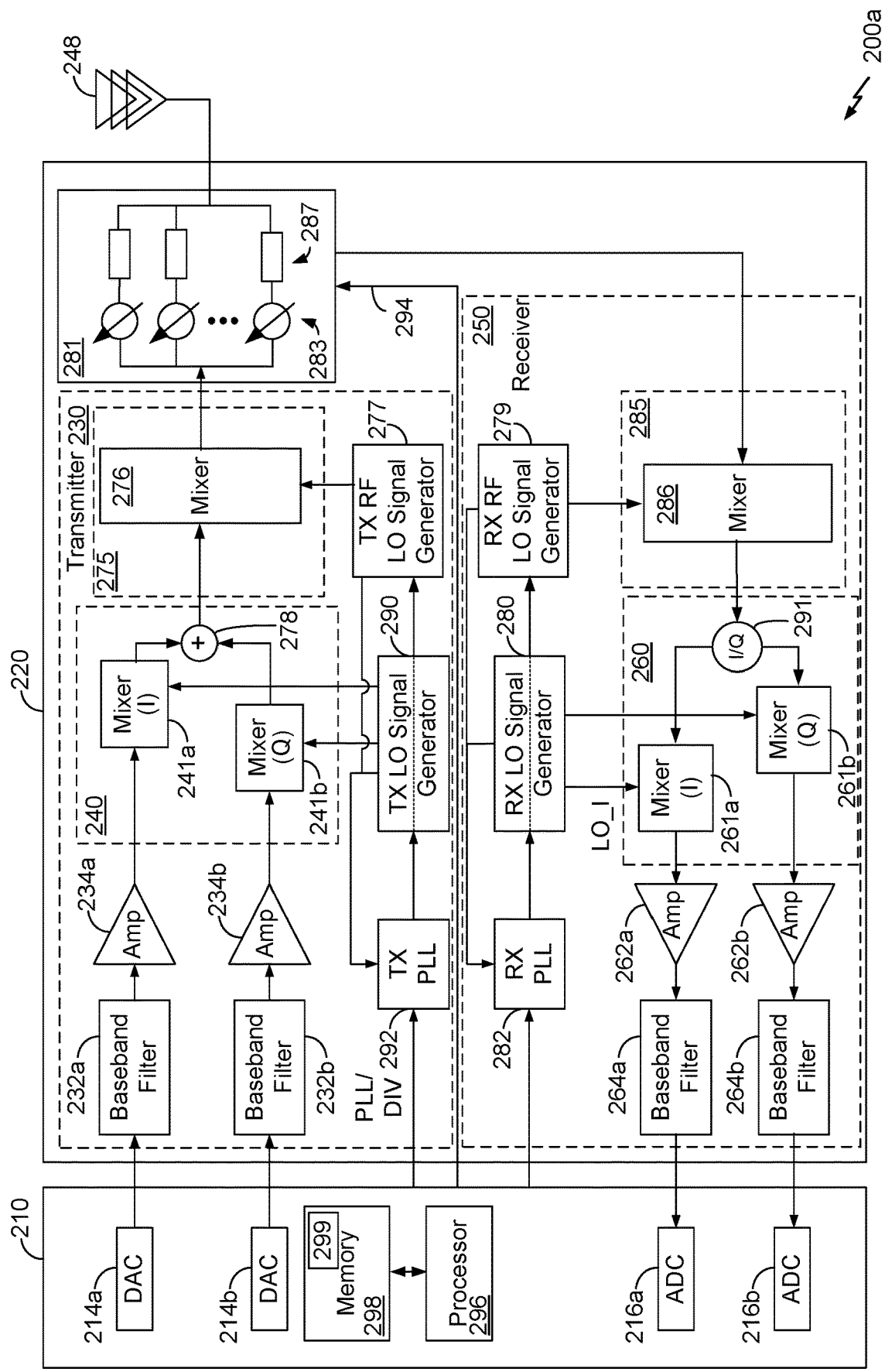
FIG. 2B is a block diagram showing a wireless device in which exemplary techniques of the present disclosure may be implemented.

FIG. 2B is a block diagram showing a wireless device in which exemplary techniques of the present disclosure may be implemented. Certain components, for example which may be indicated by identical reference numerals, of the wireless device 200a in FIG. 2B may be configured similarly to those in the wireless device 200 shown in FIG. 2A and the description of identically numbered items in FIG. 2B will not be repeated.

The wireless device 200a is an example of a heterodyne (or superheterodyne) architecture in which the upconverter 240 and the downconverter 260 are configured to process a communication signal between baseband and an intermediate frequency (IF). The IF signal may be a low IF (LIF) signal. For example, the upconverter 240 may be configured to provide an IF signal to an upconverter 275. In an exemplary embodiment, the upconverter 275 may comprise an upconversion mixer 276. The summing function 278 of upconverter 240 combines the I and the Q outputs of the upconverter 240 and provides a non-quadrature signal to the mixer 276. The combined signal may be single ended or differential. The mixer 276 is configured to receive the IF signal from the upconverter 240 and TX RF LO signals from a TX RF LO signal generator 277, and provide an upconverted RF signal to phase shift circuitry 281. While PLL 292 is illustrated in FIG. 2B as being shared by the signal generators 290, 277, a respective PLL for each signal generator may be implemented.

In an exemplary embodiment, components in the phase shift circuitry 281 may comprise one or more adjustable or variable phased array elements, and may receive one or more control signals from the data processor 210 over connection 294 and operate the adjustable or variable phased array elements based on the received control signals.

In an exemplary embodiment, the phase shift circuitry 281 comprises phase shifters 283 and phased array elements 287. Although three phase shifters 283 and three phased array elements 287 are shown for ease of illustration, the phase shift circuitry 281 may comprise more or fewer phase shifters 283 and phased array elements 287. For example, one or two arrays of four or five antennas and corresponding phase shifters/phased array elements may be implemented.

Each phase shifter 283 may be configured to receive the RF transmit signal from the upconverter 275, alter the phase by an amount, and provide the RF signal to a respective phased array element 287. Each phased array element 287 may comprise transmit and receive circuitry including one or more filters, amplifiers, driver amplifiers, and/or power amplifiers. In some embodiments, the phase shifters 283 may be incorporated within respective phased array elements 287.

The output of the phase shift circuitry 281 is provided to an antenna array 248. In an exemplary embodiment, the antenna array 248 comprises a number of antennas that typically correspond to the number of phase shifters 283 and phased array elements 287, for example such that each antenna element is coupled to a respective phased array element 287. In an exemplary embodiment, the phase shift circuitry 281 and the antenna array 248 may be referred to as a phased array.

In a receive direction, an output of the phase shift circuitry 281 is provided to a downconverter 285. In an exemplary embodiment, the downconverter 285 may comprise a down-conversion mixer 286. In an exemplary embodiment, the mixer 286 downconverts the receive RF signal provided by the phase shift circuitry 281 to an IF signal according to RX RF LO signals provided by an RX RF LO signal generator 279. The I/Q generation function 291 of downconverter 260 receives the IF signal from the mixer 286 and generates I and Q signals in the downconverter 260, which downconverts the IF signals to baseband, as described above. While PLL 282 is illustrated in FIG. 2B as being shared by the signal generators 280, 279, a respective PLL for each signal generator may be implemented.

In some embodiments, the upconverter 275, downconverter 285, and the phase shift circuitry 281 are implemented on a common IC. In some embodiments, the summing function 278 and the I/Q generation function 291 are implemented separate from the mixers 276 and 286 such that the mixers 276, 286 and the phase shift circuitry 281 are implemented on the common IC, but the summing function 278 and I/Q generation function 291 are not (e.g., the summing function 278 and I/Q generation function 291 are implemented in another IC coupled to the IC having the mixers 276, 286). In some embodiments, the LO signal generators 277, 279 are included in the common IC. In some embodiments in which phase shift circuitry is implemented on a common IC with 276, 286, 277, 278, 279, and/or 291, the common IC and the antenna array 248 are included in a module, which may be coupled to other components of the transceiver 220 via a connector. In some embodiments, the phase shift circuitry 281, for example, a chip on which the phase shift circuitry 281 is implemented, is coupled to the antenna array 248 by an interconnect. For example, components of the antenna array 248 may be implemented on a substrate and coupled to an integrated circuit implementing the phase shift circuitry 281 via a flexible printed circuit or the integrated circuit may be mounted to an opposite side of the substrate.

In some embodiments, both the architecture illustrated in FIG. 2A and the architecture illustrated in FIG. 2B are implemented in the same device. For example, a wireless device 110 or 200 may be configured to communicate with signals having a frequency below about 7 GHz (e.g., the FR1 band) using the architecture illustrated in FIG. 2A and to communicate with signals having a frequency above about 24 GHz using the architecture illustrated in FIG. 2B. In devices in which both architectures are implemented, one or more components of FIGS. 2A and 2B that are identically numbered may be shared between the two architectures. For example, both signals that have been downconverted directly to baseband from RF and signals that have been downconverted from RF to baseband via an IF stage may be filtered by the same baseband filter 264. In other embodiments, a first version of the filter 264 is included in the portion of the device which implements the architecture of FIG. 2A and a second version of the filter 264 is included in the portion of the device which implements the architecture of FIG. 2B. While certain example frequencies are described herein, other implementations are possible. For example, signals having a frequency above about 20 GHz (e.g., having a mmW frequency) may be transmitted and/or received using a direct conversion architecture. In such embodiments, for example, a phased array may be implemented in the direct conversion architecture.

Figure 2C:
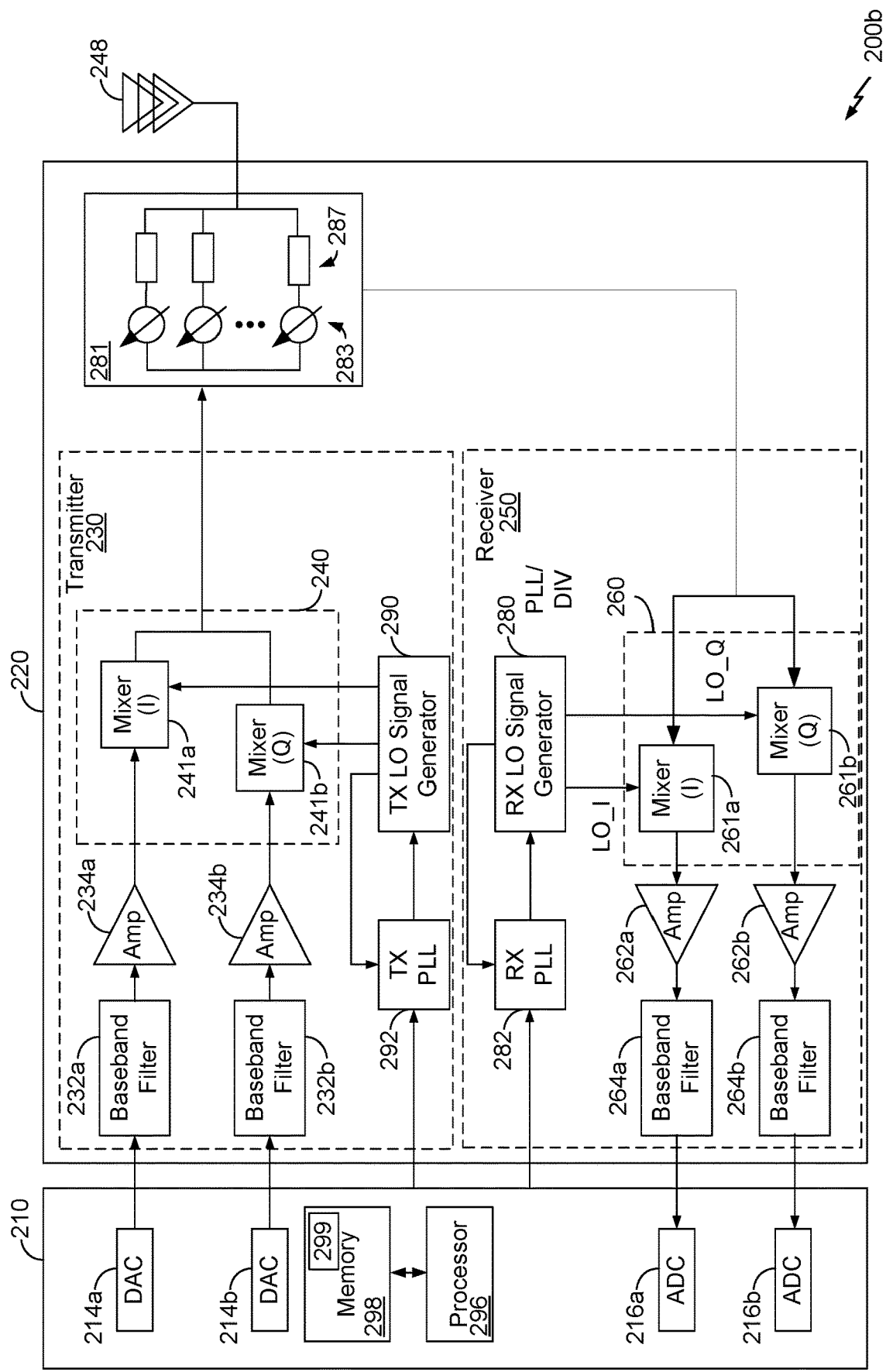
FIG. 2C is a block diagram showing a wireless device in which exemplary techniques of the present disclosure may be implemented.

FIG. 2C is a block diagram showing a wireless device in which exemplary techniques of the present disclosure may be implemented. Certain components, for example which may be indicated by identical reference numerals, of the wireless device 200b in FIG. 2C may be configured similarly to those in the wireless device 200 shown in FIG. 2A and/or the wireless device 200a shown in FIG. 2B and the description of identically numbered items in FIG. 2C will not be repeated.

The wireless device 200b in FIG. 2C incorporates the phase shift circuitry 281 (of FIG. 2B) in a direct conversion architecture, where mmW transmission signals are upconverted and downconverted between baseband and RF without the use of intermediate frequency (IF) signal conversion. For example, the LO signals in the architecture of FIG. 2C may comprise signals at frequencies of tens of GHz or above 100 GHz.

In some embodiments, the upconverter 240, downconverter 260, and the phase shift circuitry 281 are implemented on a common IC. In some embodiments, the LO signal generators 280, 290 are included in the common IC. In some embodiments, the common IC and the antenna array 248 are included in a module, which may be coupled to other components of the transceiver 220 via a connector. In some embodiments, the phase shift circuitry 281, for example, a chip on which the phase shift circuitry 281 is implemented, is coupled to the antenna array 248 by an interconnect or both are mounted to a substrate. For example, components of the antenna array 248 may be implemented on a substrate and coupled to an integrated circuit implementing the phase shift circuitry 281 via a flexible printed circuit or the integrated circuit may be mounted to an opposite side of the substrate.

Figure 3:
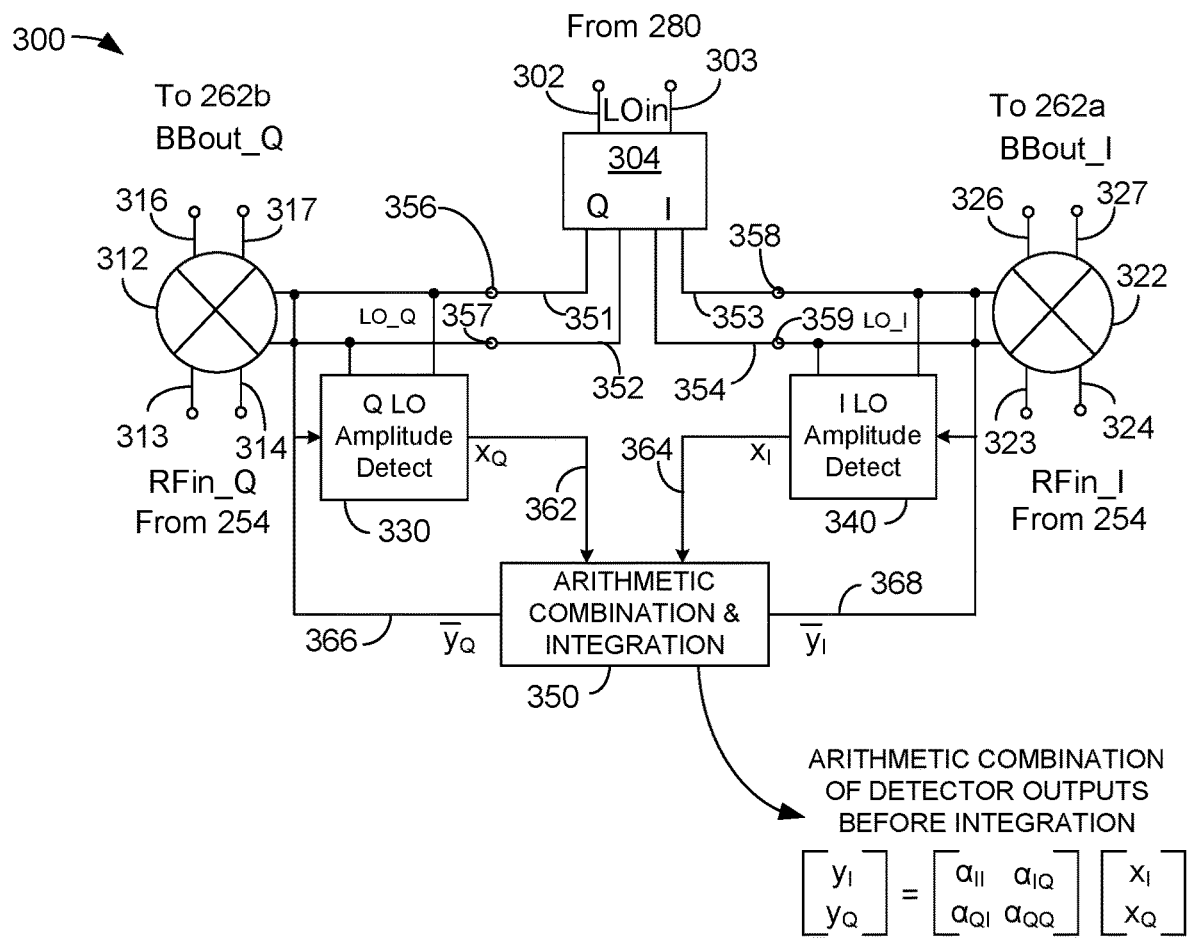
FIG. 3 is a block diagram of a mixer circuit in accordance with an exemplary embodiment of the disclosure.

FIG. 3 is a block diagram of a mixer circuit 300 in accordance with an exemplary embodiment of the disclosure. In an exemplary embodiment, the mixer circuit 300 may be configured as an active mixer circuit. In an exemplary embodiment, the mixer circuit 300 may comprise a passive quadrature generator 304, a Q mixer 312, an I mixer 322, a Q LO amplitude detect circuit 330, an I LO amplitude detect circuit 340 and a combining and integrating element 350. In an exemplary embodiment, the combining and integrating element 350 may be an arithmetic combination and integration circuit. An exemplary embodiment of a passive quadrature generator 304 is a quadrature hybrid circuit.

The passive quadrature generator 304 receives an LO input signal, LO_in, from, for example, the RX LO signal generator 280 or the TX LO signal generator 290 (FIG. 2C), and provides quadrature LO signals. For example, differential quadrature (Q) LO signal, LO_Q is provided on connections 351 and 352; and differential in phase (I) LO signal, LO_I is provided on connections 353 and 354. The Q mixer 312 receives the Q LO input signals over nodes 356 and 357; and the I mixer 322 receives the I LO input signals over nodes 358 and 359.

The Q mixer 312 receives a differential RF input signal RFin_Q, over connections 313 and 314 and provides a differential baseband output signal, BBout_Q, over connections 316 and 317. The I mixer 322 receives a differential RF input signal RFin_I, over connections 323 and 324 and provides a differential baseband output signal, BBout_I, over connections 326 and 327.

In an exemplary embodiment, the Q LO amplitude detect circuit 330 is connected to the quadrature LO_Q signal at the nodes 356 and 357; and the I LO amplitude detect circuit 340 is connected to the in phase LO_I signal and the vLOin_m signal at the nodes 358 and 359. An output, referred to as xQ, is provided from the Q LO amplitude detect circuit 330 to the arithmetic combination and integration element 350; and an output, referred to as xI, is provided from the I LO amplitude detect circuit 340 to the arithmetic combination and integration element 350. The output xQ indicates the Q LO amplitude detected by the Q LO amplitude detect circuit 330 and the output xI indicates the I LO amplitude detected by the I LO amplitude detect circuit 340.

In an exemplary embodiment, the arithmetic combination and integration element 350 receives the detected Q LO amplitude (xQ) and the detected I LO amplitude (xI) and provides a weighted and time-averaged value, yQ_bar, to the Q mixer 312 over connection 366 (for example, through first differential termination resistances connected to the passive quadrature generator 304) and provides a weighted and time-averaged value, yI_bar, to the I mixer 322 over connection 368 (for example, through second differential termination resistances connected to the passive quadrature generator 304). The weighted and time-averaged value, yQ_bar is also provided back to the Q LO amplitude detect circuit 330 and the weighted and time-averaged value, yI_bar is also provided back to the I LO amplitude detect circuit 340. In an exemplary embodiment, the arithmetic combination and integration element 350 performs integration over time and hence produces the time-average values yI_bar and yQ_bar. The value yQ_bar may be referred to as a Q LO DC bias voltage and the value yI_bar may be referred to as an I LO DC bias voltage.

In an exemplary embodiment, the arithmetic combination and integration element 350 combines the outputs of the Q LO amplitude detect circuit 330 and the I LO amplitude detect circuit 340 (xQ and xI) to provide control voltages yQ_bar and yI_bar, which represent the DC bias that may be applied to the Q mixer 312 and the I mixer 322 through differential termination resistances connected to the passive quadrature generator 304 respectively, so as to optimize the image rejection ratio (IRR) of the IQ mixer comprising the Q mixer 312 and the I mixer 322. In this manner, the mixer core's rejection of LO imbalance may be improved without the need to improve the LO imbalance directly at the passive quadrature generator 304. Differential termination resistances are described further in reference to FIG. 4A.

Figure 4A:
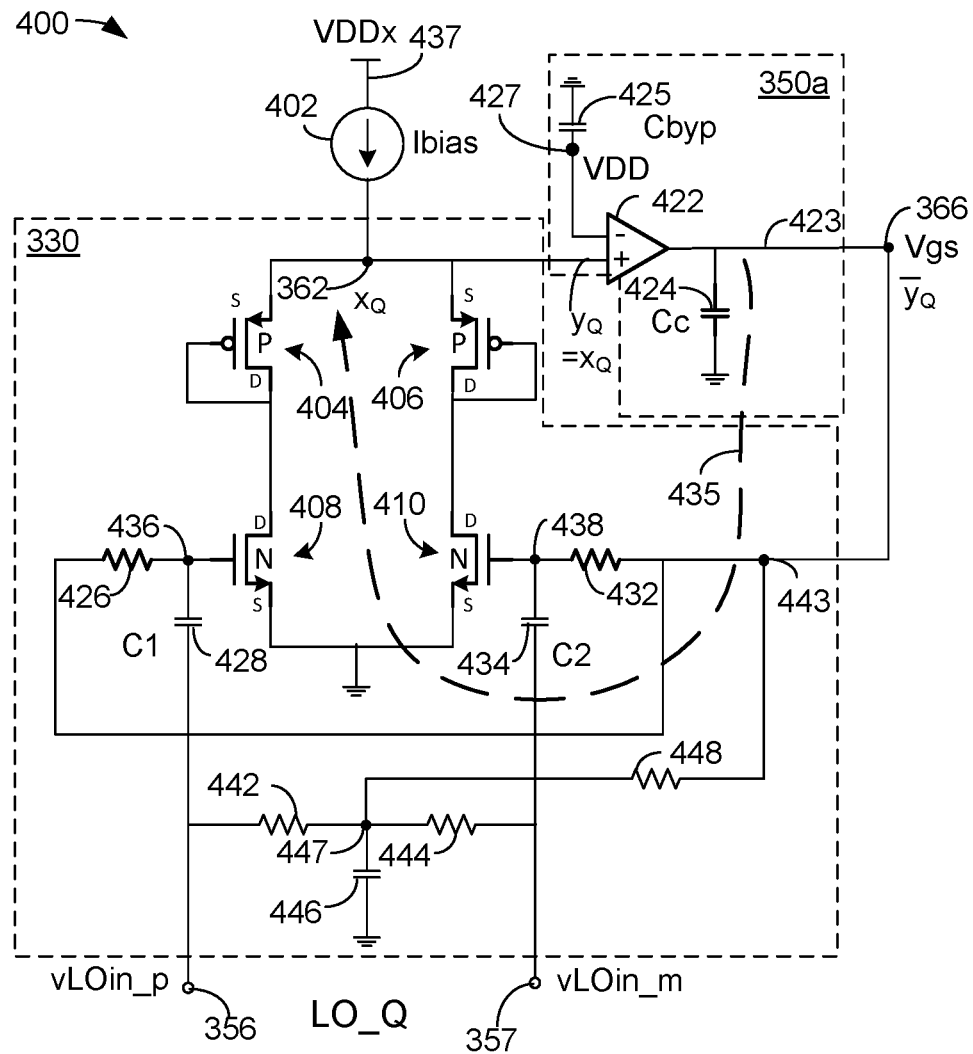
FIG. 4A is a block diagram of a LO amplitude detect circuit of FIG. 3 having an independent bias loop for each of I and Q in accordance with an exemplary embodiment of the disclosure.

FIG. 4A is a block diagram of a bias circuit 400 having an LO amplitude detect circuit 330 of FIG. 3, and a portion of the arithmetic combination and integration element 350 FIG. 3. The Q LO amplitude detect circuit 330 and the portion 350a of the arithmetic combination and integration element 350 are configured to process the Q signals. The bias circuit 400 shows an independent bias loop 435 for the Q signals; however, a bias circuit and an independent bias loop for I signals would be similar.

In an exemplary embodiment, the bias circuit 400 is a detailed version of portions of the mixer circuit 300 of FIG. 3, including additional detail of the Q LO amplitude detect circuit 330 and portions of the arithmetic combination and integration element 350; however, another iteration (not shown in FIG. 4A) of the bias circuit 400 can operate as the I LO amplitude detect circuit 340 and the portion of the arithmetic combination and integration element 350 that can process the I signals.

In an exemplary embodiment, the bias circuit 400 includes a current source 402 connected to a supply voltage, VDDx at a node 437. The voltage VDDx is a supply voltage that is higher than the supply voltage VDD. In an exemplary embodiment, the value of VDD and the value of VDDx may vary based on implementation and semiconductor process. In an exemplary embodiment, the bias circuit 400 acts to maintain its point of connection to the current source 402 (node 362) equal to the value of the main mixer core supply voltage value VDD, such that the node 362 has a voltage equal to VDD. The bias circuit 400 also includes transistors 404, 406, 408 and 410. In an exemplary embodiment, the transistors 404 and 406 may be P-type devices and the transistors 408 and 410 may be N-type devices. In an exemplary embodiment, the source of the transistor 404 and the source of the transistor 406 may be connected to the node 362, which represents the value xQ (FIG. 3) in this exemplary embodiment. In this example, the value of the voltage at node 362 (xQ) is driven by the bias circuit 400 to match the supply voltage VDD at the node 427. The drain and gate of the transistor 404 are connected together and the drain and the gate of the transistor 406 are connected together to mimic the corresponding connections of transistors 504 and 506 in FIG. 5A. The drain of the transistor 404 is connected to the drain of the transistor 408. The drain of the transistor 406 is connected to the drain of the transistor 410. The source of the transistor 408 and the source of the transistor 410 are connected to ground.

The differential LO_Q signal is provided at nodes 356 and 357 (FIG. 3) and to nodes 436 and 438 through capacitors 428 and 434, respectively. Positive and negative terminals of LO_Q are labeled at nodes 356 and 357 as vLOin_p and vLOin_m, respectively. The capacitances 428 and 438 are series coupling capacitors that allow only very high frequency LO signals to pass, but they also act to reduce the effective shunt capacitive loading presented to the passive quadrature generator 304 (FIG. 3), and hence the loaded phase imbalance of the passive quadrature generator 304. The gate of the transistor 408 is connected to the node 436, and the gate of the transistor 410 is connected to the node 438.

Figure 4B:
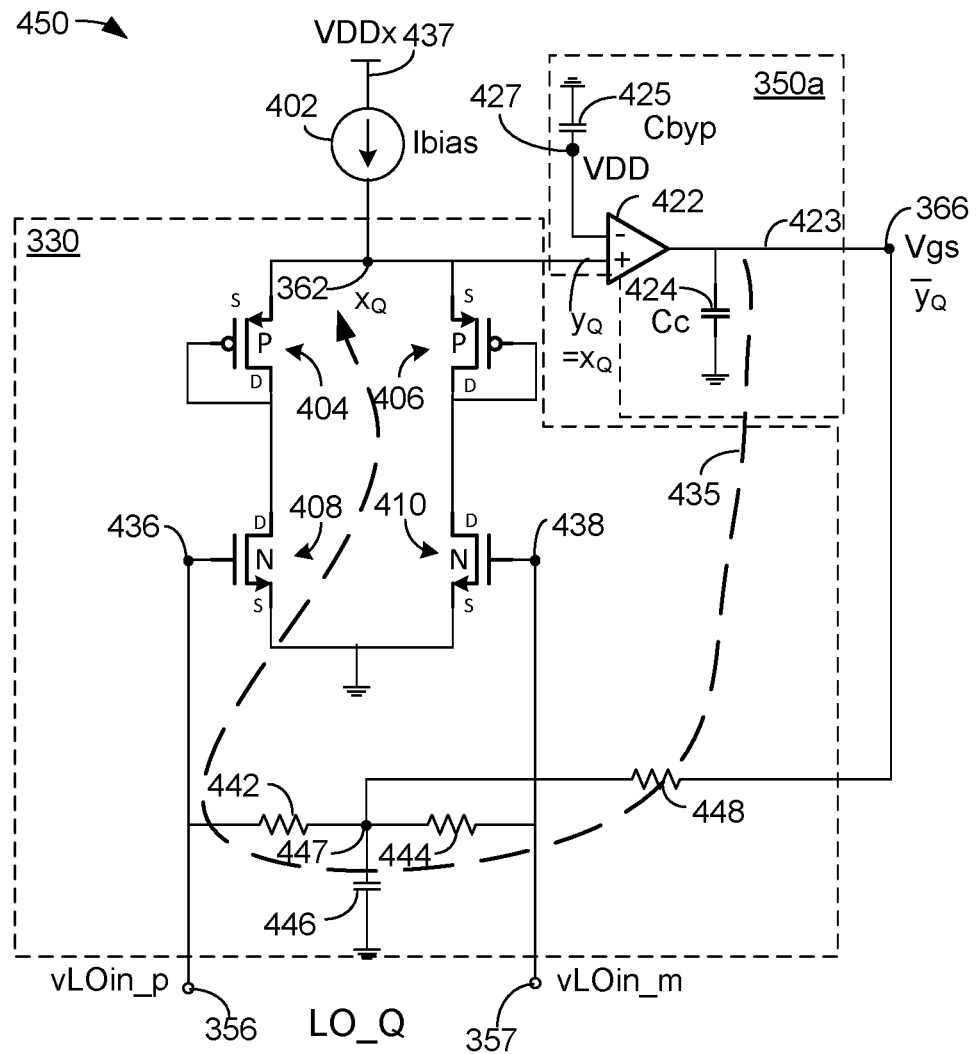
FIG. 4B is a block diagram of an alternative exemplary embodiment of an LO amplitude detect circuit of FIG. 3 having an independent bias loop for each of I and Q in accordance with an exemplary embodiment of the disclosure.

A resistance 426 is also connected between the node 436 and a node 443 and a resistance 432 is connected between the node 438 and the node 443. A capacitance 446 connected between the node 447 and system ground, and a resistance 448 connected between the node 447 and the node 443 form a low pass filter. In an alternative exemplary embodiment, the resistors 426 and 432 and the capacitors 428 and 434 can be omitted and the LO_Q signals vLOin_p and vLOin_m can be connected directly to nodes 436 and 438, respectively. This alternative exemplary embodiment is shown in FIG. 4B.

In an exemplary embodiment, a resistance 442 is connected between the node 356 and the node 447, and a resistance 444 is connected between the node 357 and the node 447. In an exemplary embodiment, the resistances 442 and 444 form what are referred to as differential termination resistances. In an exemplary embodiment, a value of the resistances 442 and 444 of approximately 100 ohms limits the quadrature hybrid phase imbalance of the passive quadrature generator 304 (FIG. 3) that could be caused by direct capacitive loading of the mixers 312 and 322. In an exemplary embodiment, the differential termination resistances 442 and 444 located at the ports 356 (vLOin_p) and 357 (vLOin_m) (LO_Q of the passive quadrature generator 304 (FIG. 3)) allow the passive quadrature generator 304 to connect directly to the mixer cores (mixers 312 and 322) at the nodes 356 and 357 (and nodes 358 and 359) without any impedance matching or buffer circuitry. This minimizes the area consumed on the integrated circuit (IC) because it eliminates impedance matching circuitry between the passive quadrature generator 304 and the mixers 312 and 322. This arrangement also avoids the need to calibrate for I/Q mismatches in impedance matching elements that would otherwise be used between the passive quadrature generator 304 and the mixers 312 and 322. This arrangement also limits phase imbalance due to the direct capacitive loading by the mixers 312 and 322 for example, through the capacitances associated with the gates of the mixer transistors 508, 510, 520, 522, which will be discussed in reference to FIG. 5A. In an exemplary embodiment, the differential termination resistances have a value that is twice a characteristic impedance of the passive quadrature generator.

In an exemplary embodiment, the arithmetic combination and integration element 350a includes an amplifier 422 and a capacitance 424. In an exemplary embodiment having independent I and Q amplitude detect circuits (330 and 340 in FIG. 3), the amplifier 422 includes an inverting input connected to the voltage, VDD, at the node 427 and a non-inverting input connected to the node 362. A bypass capacitor 425 is connected between the node 427 and ground. The node 362 represents the value xQ, which is identical to the value yQ for an exemplary embodiment having independent I and Q amplitude detect circuits as shown in FIG. 3. In an exemplary embodiment, the amplifier 422 may be referred to as a bias loop error amplifier and the capacitance 424 may be referred to as a compensation capacitance. In an exemplary embodiment, a bias loop 435 comprises error amplifier 422, compensation capacitor 424, bias resistors 426 and 432, common source transistors 408 and 410, and load transistors 404 and 406. The bias loop 435 adjusts the DC voltage of node 423 which is connected to node 443 in order to cause the voltage at node 362, also labeled xQ, to approach the supply voltage, VDD, despite variations in the amplitude of vLOin_p and vLOin_m (LO_Q in FIG. 3 and FIG. 4A) by controlling the time averaged current, also called the DC bias current, of the transistors 408 and 410.

In an exemplary embodiment, the Q LO amplitude detect circuit 330 detects the amplitude of the quadrature LO signal as a DC voltage level (xQ) and the I LO amplitude detect circuit 340 detects the amplitude of the in phase LO signal as a DC voltage level (xI in FIG. 3).

In an exemplary embodiment, the arithmetic combination and integration element 350 (FIG. 3) generates an I LO DC bias voltage that is a function of the I LO amplitude only and generates a Q LO DC bias voltage that is a function of the Q LO amplitude only. For example, in the circuit 400 of FIG. 4A, the value of xQ (at node 362) is applied directly to the inverting input of the amplifier 422. The amplifier 422 and the capacitance 424 perform an integration function and generate the value yQ_bar at the node 366 as a function of xQ only. The value yQ_bar is applied to the mixer 312 (FIG. 3) as a Q LO DC bias voltage. A similar circuit can generate the I LO DC bias voltage yI_bar using the detected I LO amplitude xI only. In this example where the Q LO DC bias voltage (yQ_bar) is a function of the Q LO amplitude only, the coefficients in the matrix shown in FIG. 3 may be represented by $\alpha II=\alpha QQ=1$, and $\alpha IQ=\alpha QI=0$.

In an alternative exemplary embodiment, the arithmetic combination and integration element 350 generates a Q LO DC bias voltage from a weighted sum of Q (xQ) and I (xI) LO amplitude voltages. In a matrix form, this is represented by $yQ=\alpha\ QI\ XI+\alpha\ QQ\ XQ$.

In an alternative exemplary embodiment, the arithmetic combination and integration element 350 generates an I LO DC bias voltage from a weighted sum of Q (xQ) and I (xI) LO amplitude voltages. In a matrix form, this is represented by $yI=\alpha\ II\ XI+\alpha\ IQ\ XQ$.

In an alternative exemplary embodiment, the Q (xQ) and I (xI) LO amplitude voltages are equally weighted.

An output of the amplifier 422 is provided over connection 423 to the node 366 (FIG. 3) and forms the output, yQ_bar. The output, yQ_bar, also represents the gate-source voltage (Vgs) of the transistors 404 and 406 and is an integrated (time-averaged) version of yQ.

In an exemplary embodiment, the differential termination resistances 442 and 444 limit the LO I and the LO Q phase imbalance as mentioned above, while amplitude imbalance of the passive quadrature generator 304 is rejected by the Q LO amplitude detect circuit 330 and the I LO amplitude detect circuit 340 in the Q and I paths, respectively.

In an exemplary embodiment, the output of the error amplifier 422 (Vgs) at node 423 is applied through the resistance 448 to a common mode point (node 447) of vLOin_p and vLOin_m. The voltage Vgs is applied through the resistor 448 to the node 447 which is the center node of the termination resistances 442 and 444.

FIG. 4B is a block diagram of an alternative exemplary embodiment of an LO amplitude detect circuit of FIG. 3 having an independent bias loop for each of I and Q in accordance with an exemplary embodiment of the disclosure. In an exemplary embodiment, the bias circuit 450 of FIG. 4B is similar to the bias circuit 400 of FIG. 4A. However, in FIG. 4B, the bias circuit 450 omits the resistors 426 and 432 and omits the capacitors 428 and 434 such that the node 356 is connected directly to the node 436 and the node 357 is connected directly to the node 438. In this alternative exemplary embodiment, the termination resistors 442 and 444 are included in the bias loop 435. In an exemplary embodiment, the bias circuit 450 may improve the mixer's rejection of amplitude imbalance even if slightly degrading the phase imbalance through larger capacitive loading of the passive quadrature generator (304 of FIG. 3). In an exemplary embodiment, the bias circuit 450 may be implemented for a quadrature generator that inherently has poor amplitude balance but excellent phase balance when terminated by only its characteristic impedance at each port.

Figure 4C:
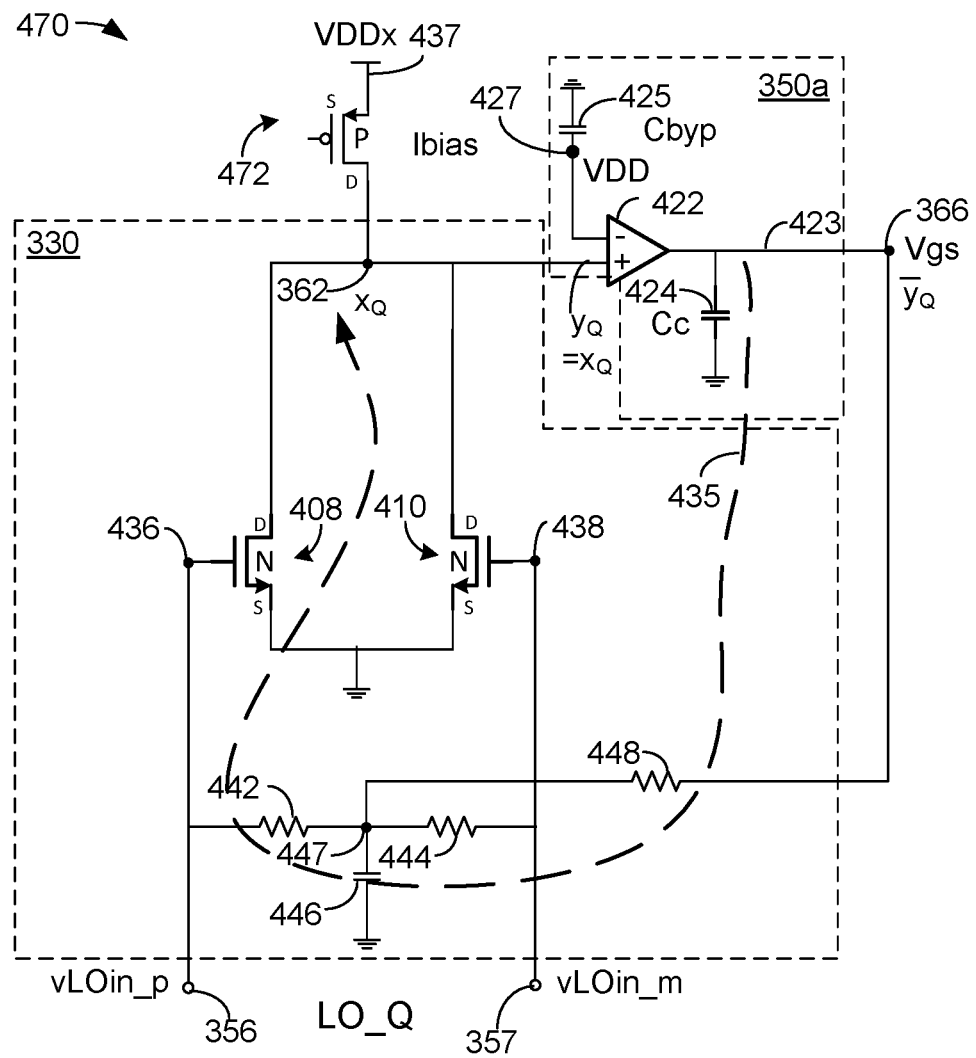
FIG. 4C is a block diagram of an alternative exemplary embodiment of an LO amplitude detect circuit of FIG. 3 having an independent bias loop for each of I and Q in accordance with an exemplary embodiment of the disclosure.

FIG. 4C is a block diagram of an alternative exemplary embodiment of an LO amplitude detect circuit of FIG. 3 having an independent bias loop for each of I and Q in accordance with an exemplary embodiment of the disclosure. In an exemplary embodiment, the bias circuit 470 of FIG. 4C is similar to the bias circuit 450 of FIG. 4B. However, in FIG. 4C, the bias circuit 470 omits the transistors 404 and 406. In FIG. 4C current source 402 is represented as a current supply transistor 472. The source of the transistor 472 is connected to the system voltage VDDx and the drain of the transistor 472 is connected to the node 362, which is connected to the drain of the transistor 408 and to the drain of the transistor 410. The gate of transistor 472 is connected to a voltage that causes the drain to source current of the transistor 472 to be equal to Ibias when the drain voltage of transistor 472 is equal to VDD. The exemplary embodiment shown in FIG. 4C may enable better compatibility with a transimpedance amplifier with current-mode input at the baseband ports. The exemplary embodiment shown in FIG. 4C may also increase the drain to source voltages of the transistors 408 and 410 and corresponding mixer transistors 508, 510, 520, and 522 in FIG. 5B, which may improve the mixer linearity. The alternative embodiment shown in FIG. 4C could also include resistors 426 and 432 and capacitors 428 and 434 as shown in FIG. 4A without changing any other elements of the embodiment of FIG. 4C.

Figure 5A:
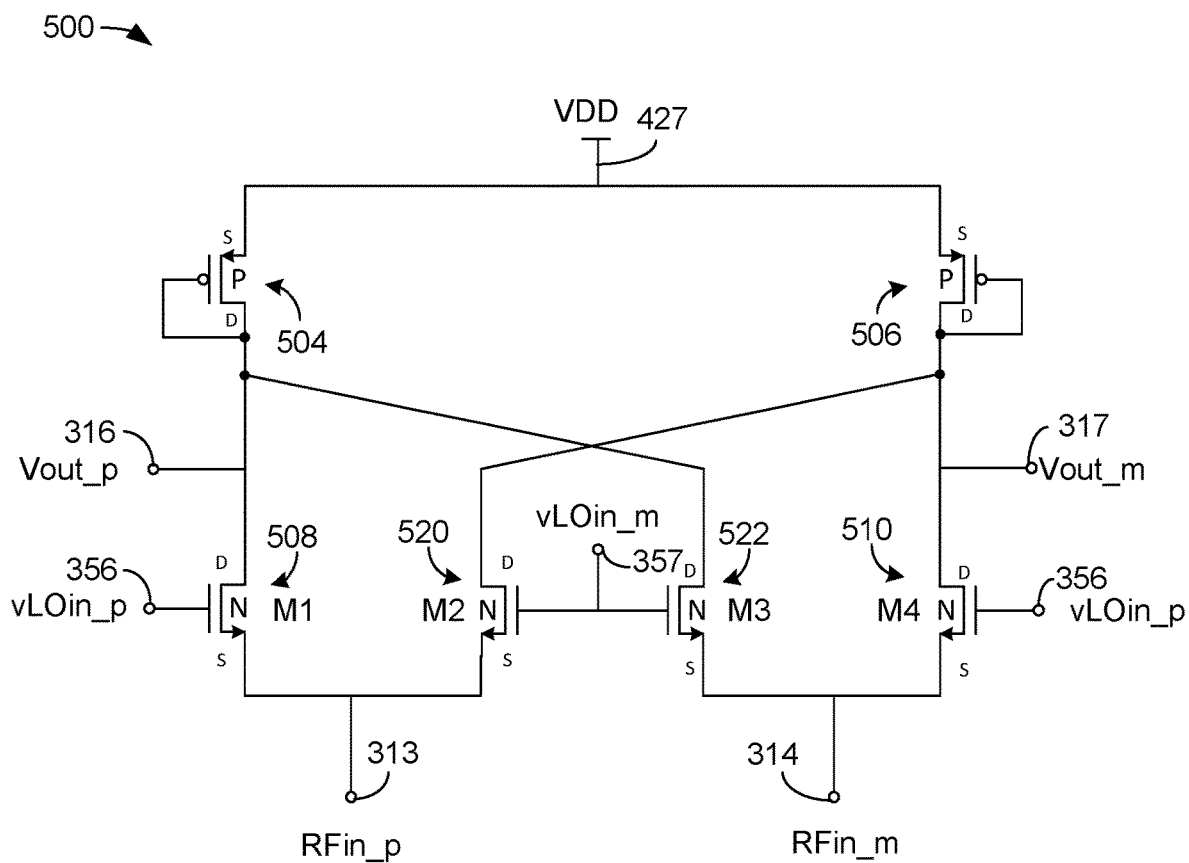
FIG. 5A is a block diagram of a mixer core in accordance with an exemplary embodiment of the disclosure.

FIG. 5A is a block diagram of a mixer core in accordance with an exemplary embodiment of the disclosure. In an exemplary embodiment, the mixer core 500 may be an example of the mixer 312 or the mixer 322 of FIG. 3. In the description of FIG. 5A, the mixer core 500 is an example of the mixer 312 of FIG. 3. In an exemplary embodiment, the mixer core 500 includes transistors 504, 506, 508, 520, 522 and 510. In an exemplary embodiment, the transistors 504 and 506 may be P-type devices and the transistors 508, 520, 522 and 510 may be N-type devices. In an exemplary embodiment, the source of the transistor 504 and the source of the transistor 506 may be connected to supply voltage, VDD. The drain and gate of the transistor 504 are connected together and the drain and the gate of the transistor 506 are connected together. The drain of the transistor 504 is connected to the drain of the transistor 508. The drain of the transistor 506 is connected to the drain of the transistor 510. The drain of the transistor 504 is also connected to the drain of the transistor 522; and the drain of the transistor 506 is connected to the drain of the transistor 520. In the embodiment shown in FIG. 5A transistors 504 and 506 are diode connected load transistors.

In another alternative exemplary embodiment, the Q LO amplitude detect circuit 330 can be replaced by a common mode sensing circuit having resistors connected between the drains of transistors 504 and 506. The common mode voltage is indicative of the LO amplitude and is connected to the non inverting input terminal of error amplifier 422 in such embodiment. This alternative embodiment will be described in FIG. 8.

The source of the transistor 508 and the source of the transistor 520 are connected to the node 313, which is the RF input signal, RFin_p. The source of the transistor 522 and the source of the transistor 510 are connected to the node 314, which is the RF input signal, RFin_m. The sources of transistors 508, 520, 522 and 510 may have a DC voltage equal to system ground and the RFin_p and RFin_m signals may be provided by a matching network (not shown) that couples the RF signal from the LNA 252 (FIG. 2A) or phase shifter array 281 (FIG. 2B or FIG. 2C) to the mixer core 500 via the nodes 313 and 314. The matching network (not shown) may be a transformer based matching network.

The quadrature vLOin_p portion of the LO_Q signal on connection 356 is provided to the gate of the transistor 508 and to the gate of the transistor 510. The quadrature vLOin_m portion of the LO_Q signal on connection 357 is provided to the gate of the transistor 520 and to the gate of the transistor 522.

The BBout_Q signal Vout_p is provided over the node 316 and the BBout_Q signal Vout_m is provided over the node 317.

In an exemplary embodiment, the transistors 404 and 406, in the LO amplitude detect circuit 330 (FIG. 4A) provide a replica of the transistors 504 and 506, while the transistor 408 in the LO amplitude detect circuit 330 (FIG. 4A) provides a replica of transistors 508 and 510 and transistor 410 in the LO amplitude detect circuit 330 (FIG. 4A) provides a replica of transistors 520 and 522 in the mixer core 500.

In an exemplary embodiment, the Q LO amplitude detect circuit 330 and the I LO amplitude detect circuit 340 act as replicas of the switching devices (the transistors 508, 520, 522 and 510) and the load devices (transistors 504 and 506) in the mixer core 500. The Q LO amplitude detect circuit 330 and the I LO amplitude detect circuit 340 each include a bias loop (435 in FIG. 4A) as described above to force the average drain current in the mixer core 500 to be equal to the Ibias of current source 402 (FIG. 4A) scaled by the ratio of the widths of the transistors 408/410 to the widths of the transistors 508/522 and 510/520.

The LO signal injected through the nodes 356 and 357 (FIG. 4A) to nodes 436 and 438 (FIG. 4A) through the capacitors 428 and 434 (FIG. 4A) enables the transistors 408 and 410 within the bias circuit 400 to replicate the variation in DC operating point versus LO signal strength of the transistors 508 and 520 (or the transistors 522 and 510) in the mixer core 500. The bias loop 435 (FIG. 4A) acts to adapt the time-averaged voltage at node 362 (FIG. 4A) to VDD by controlling the time-average voltages at nodes 436 and 438. The bias loop 435 counteracts the self-biasing behavior that would otherwise modify the average drain currents of transistors 408 and 410 in the presence of an AC or DC coupled LO signal swing at the nodes 436 and 438. Thus, the bias loop 435 is used to provide controlled time-averaged voltages at nodes 356 and 357 that maintain a fixed average drain current in the transistors 508 and 520 (and in the transistors 522 and 510).

When the LO signal swing (voltage swing) increases, the transistors 408 and 410 self-bias to a higher DC operating current because they don't have a tail bias current at the common source connection of the transistor (nodes 313 and 314) to control the DC operating current. It is desired to keep the average DC current flowing through the mixer devices (transistors 508 and 520 and transistors 522 and 510) a constant equal to the Ibias current (current source 402, FIG. 4A) scaled by the ratio of transistor widths as mentioned above, and force the source voltage of the transistors 404 and 406 to be constant equal to the VDD reference as controlled by the error amplifier 422. The bias loop 435 controls the average gate voltage of the replica devices 408 and 410 and consequently the switching devices 508, 510, 520 and 522 in the mixer core 500, to cancel I and Q amplitude imbalance. It is desirable to adapt the gate voltage of the transistors 408 and 410 so it drops lower if the current through the transistors 408 and 410 increases instantaneously. In this manner, the time-averaged currents through the transistors 404, 406, 408 and 410 are forced to remain constant over varying LO signal strength.

Figure 5B:
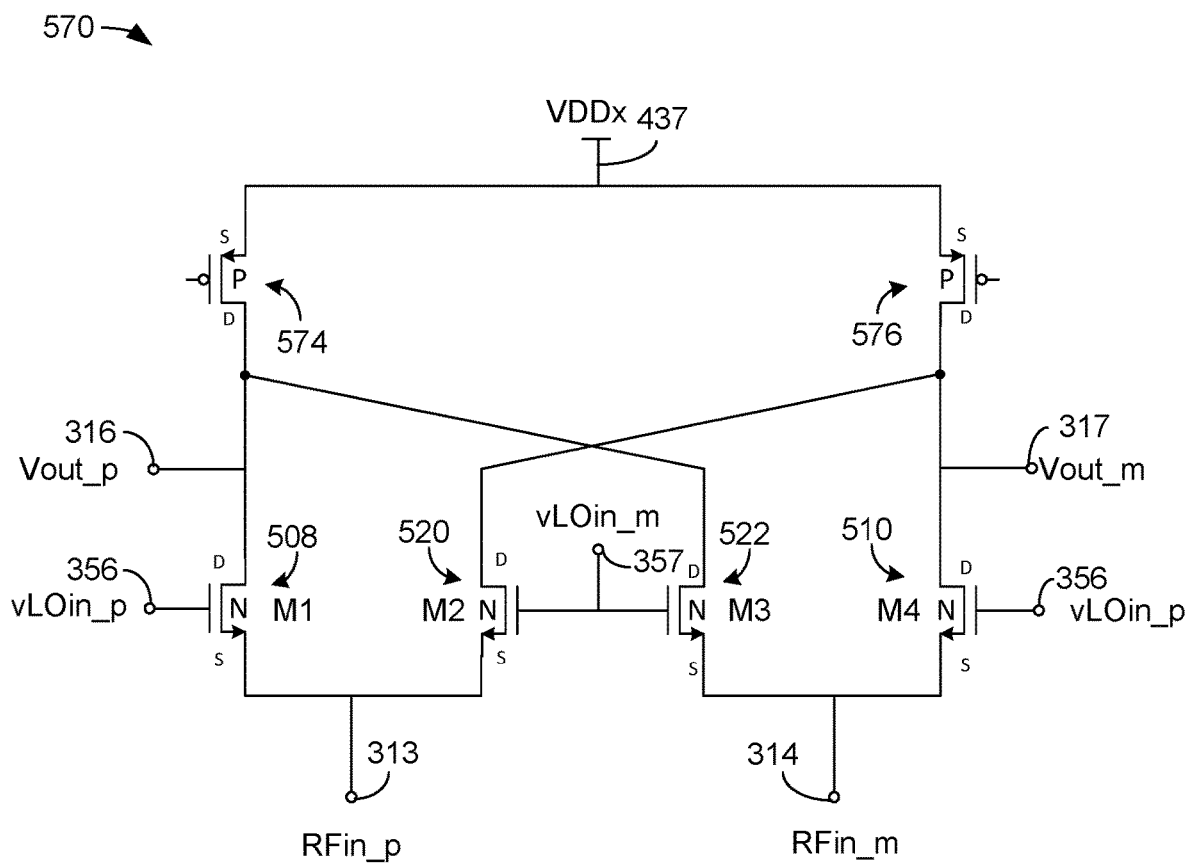
FIG. 5B is a block diagram of an alternative exemplary embodiment of a mixer core in accordance with an exemplary embodiment of the disclosure.

FIG. 5B is a block diagram of an alternative exemplary embodiment of a mixer core 570 in accordance with an exemplary embodiment of the disclosure. The mixer core 570 of FIG. 5B is similar to the mixer core 500 of FIG. 5A. However, in FIG. 5B, the diode-connected transistor 504 is replaced with a current source transistor 574; and the diode-connected transistor 506 is replaced with a current source transistor 576. The source terminals of current source transistors 574 and 576 are connected to a node 437 having a supply voltage VDDx. The transistors 574 and 576 correspond to the transistor 472 of FIG. 4C. In the alternative embodiment shown in FIG. 4C, the gate bias voltages of the transistors 574 and 576 are the same as the gate bias voltage for the Ibias current source transistor 472 in FIG. 4C.

Figure 6:
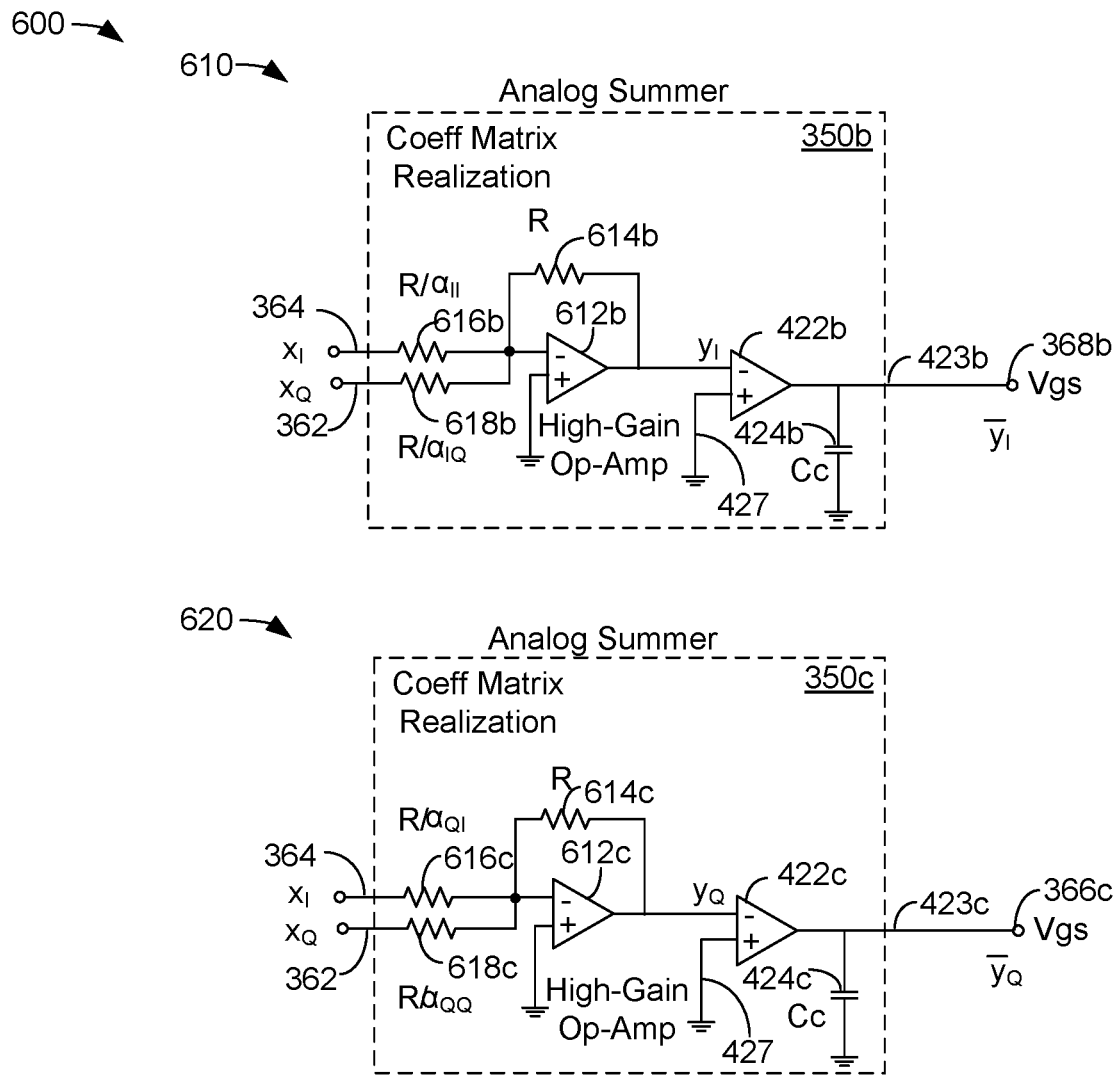
FIG. 6 is a diagram of an exemplary embodiment of the arithmetic combination element of FIG. 3.

FIG. 6 is a diagram of an exemplary embodiment of the arithmetic combination and integration element of FIG. 3. In an exemplary embodiment, an arithmetic combination and integration circuit 600 may implement the functionality of the arithmetic combination and integration element 350 of FIG. 3 in an implementation where a Q LO DC bias voltage is generated from a weighted sum of Q (xQ) and I (xI) LO amplitude voltages and an I LO DC bias voltage is generated from a weighted sum of Q (xQ) and I (xI) LO amplitude voltages. The circuit 600 is an example of the arithmetic combination and integration element 350 using a generalized choice of weighting for the output of the Q LO amplitude detect circuit 330 and the I LO amplitude detect circuit 340 and to generate the control voltages yQ and yI. For example, the circuit 610 shows an arithmetic combination and integration element 350b that can be used to control the bias of the in phase mixer and the circuit 620 shows an arithmetic combination and integration element 350c that can be used to control the bias of the quadrature mixer.

In an exemplary embodiment, the arithmetic combination and integration element 350b may comprise an amplifier 612b, and resistances 614b, 616b and 618b. The amplifier 612b may comprise a high-gain operational amplifier. In this example, the resistance 614b may have a value R. Further, the resistance 616b may have a value R/αII and the resistance 618b may have a value R/αIQ. In an exemplary embodiment, the output of the amplifier 612b is the signal, yI, which is provided to the inverting input of the error amplifier 422b. An output of the error amplifier 422b at node 368b is the control signal, yI_bar, and may be applied to the mixer 322 or nodes 358 and 359 directly or through a termination resistance circuit.

In an exemplary embodiment, the arithmetic combination and integration element 350c may comprise an amplifier 612c, and resistances 614c, 616c and 618c. The amplifier 612c may comprise a high-gain operational amplifier. In this example, the resistance 614c may have a value R. Further, the resistance 616c may have a value R/αQI and the resistance 618c may have a value R/αQQ. In an exemplary embodiment, the output of the amplifier 612c is the signal, yQ, which is provided to the inverting input of the error amplifier 422c. An output of the error amplifier 422c at node 366c is the control signal, yQ_bar, and may be applied to the mixer 312 or nodes 356 and 357 directly or through a termination resistance circuit.

Figure 7:
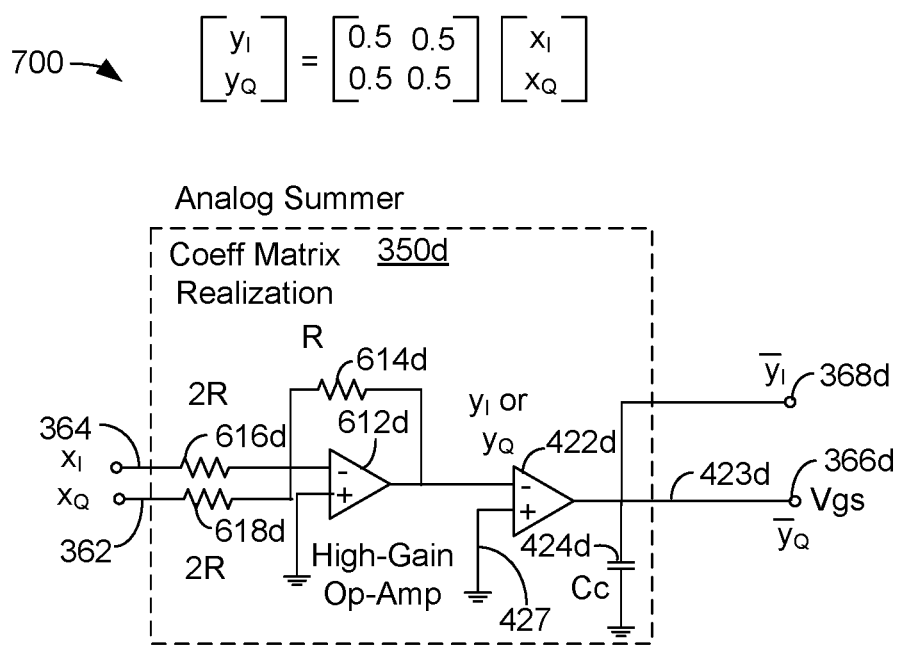
FIG. 7 is a diagram of an exemplary embodiment of the arithmetic combination element of FIG. 3.

FIG. 7 is a diagram of an exemplary embodiment of the arithmetic combination and integration element of FIG. 3. In an exemplary embodiment, an arithmetic combination and integration circuit 700 may implement the functionality of the arithmetic combination and integration element 350 of FIG. 3. The circuit 700 is an example of the arithmetic combination and integration element 350 averaging the output of the Q LO amplitude detect circuit 330 and the I LO amplitude detect circuit 340 to generate the control voltages yQ_bar and yI_bar.

In an exemplary embodiment, the arithmetic combination and integration element 350d may comprise an amplifier 612d, and resistances 614d, 616d and 618d. The amplifier 612d may comprise a high-gain operational amplifier. In this example, the resistance 614d may have a value R. Further, the resistance 616d may have a value 2R and the resistance 618d may have a value 2R. In an exemplary embodiment, the output of the amplifier 612d is the signal, yI or yQ, which is provided to the inverting input of the error amplifier 422d. An output of the error amplifier 422d at node 366d is the control signal, yQ_bar, which may be applied to the mixer 312 or nodes 356 and 357 directly or through a termination resistance circuit, and an output of the error amplifier 422d at node 368d is the control signal, yI_bar, which may be applied to the mixer 322 or nodes 358 and 359 directly or through a termination resistance circuit.

Figure 8:
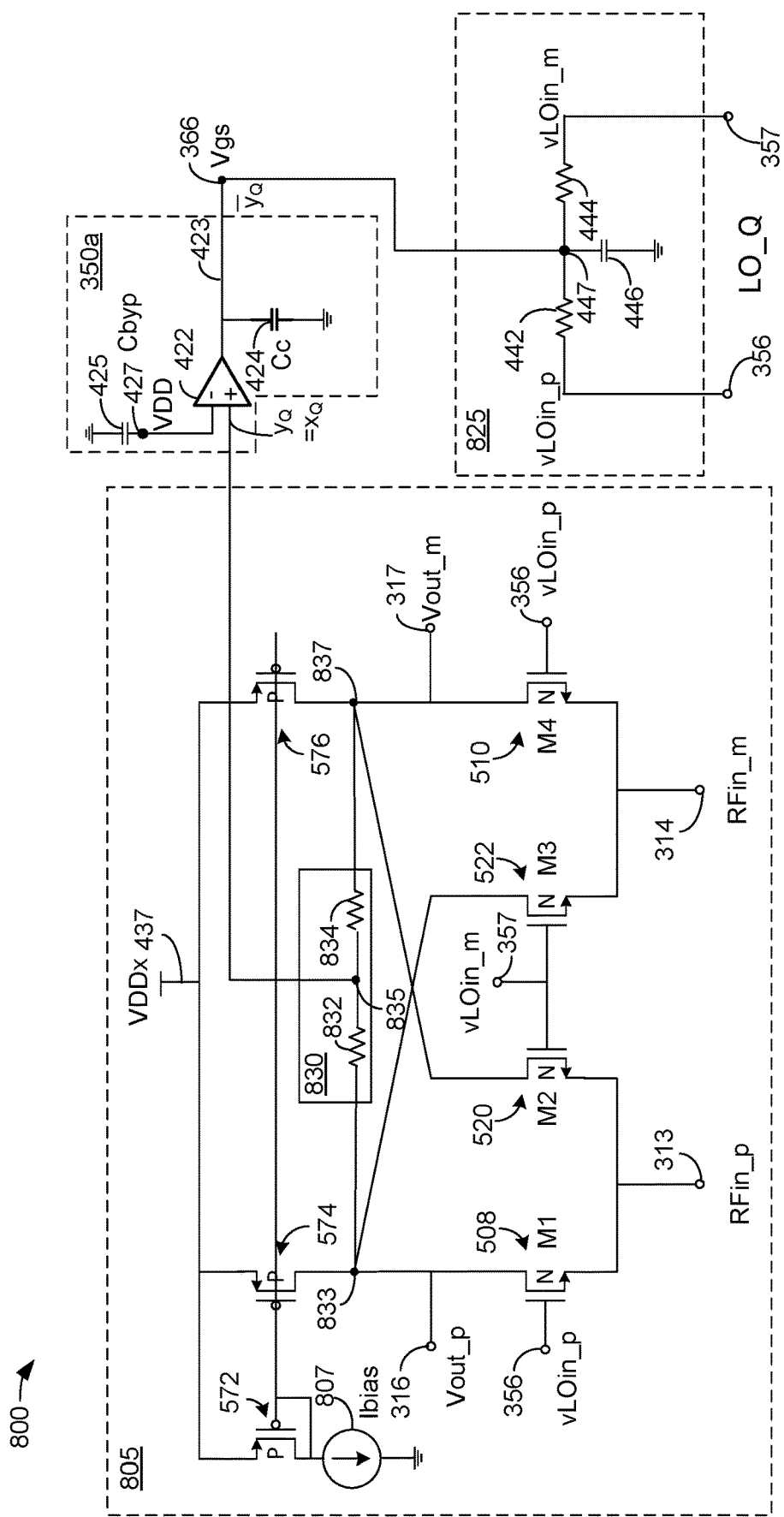
FIG. 8 is a diagram of an alternative exemplary embodiment of portions of the mixer circuit of FIG. 3 and mixer core of FIG. 5B.

FIG. 8 is a diagram of an alternative exemplary embodiment of portions of the mixer circuit of FIG. 3 and mixer core of FIG. 5B. In an exemplary embodiment, the circuit 800 may include a mixer core 805, the portion 350a of the arithmetic combination and integration element 350 (FIG. 3) and a termination resistance circuit 825.

In an exemplary embodiment, the mixer core 805 is similar to the mixer core 570 of FIG. 5B and elements in FIG. 8 that are identically numbered to elements in FIG. 5B will not be described in detail. In an exemplary embodiment, the mixer core 805 includes a current source reference transistor 572 having a source connected to the system voltage, VDDx, at node 437 and a drain connected to a current source 807. The gates of the transistors 572, 574 and 576 are connected together and are biased by the current source 807. In an exemplary embodiment, the Q LO amplitude detect circuit 330 of FIG. 3 and FIGS. 4A, 4B and 4C may be approximated by a common mode sensing circuit 830. In normal operation of the transceiver, RF input signals at nodes 313 and 314 in the main mixer core 805 may degrade the accuracy of the continuous bias loop (435 in FIGS. 4A, 4B and 4C) due to the bias of transistors 508, 520, 522, and 510 being a function of both LO amplitude and RF signal amplitude. This is different than the replica bias circuits 400 (FIG. 4A), 450 (FIG. 4B) and 470 (FIG. 4C) where the bias of the transistors in the bias loop is a function of LO amplitude only. In an exemplary embodiment, the common mode sensing circuit 830 may include a resistance 832 and a resistance 834 arranged as a resistive divider. The resistance 832 may be connected between a node 833 at the drain of the transistor 574 and a node 835. The resistance 834 may be connected between a node 837 at the drain of the transistor 576 and the node 835.

In an exemplary embodiment, the resistances 832 and 834 sense the common mode voltage at the node 835. The common mode voltage at the node 835 is indicative of the LO amplitude and is connected to the non inverting input terminal of the error amplifier 422. The bias voltage output, yQ_bar, of the error amplifier 422 at the node 366 is provided to the node 447 between the resistances 442 and 444 and provided to the nodes 356 and 357 as described above.

Examples are described above in which the combining and integrating element 350 and corresponding matrix coefficients (αII, αQQ, αIQ, αQI) and bias loops are implemented with analog circuitry. In other examples, the combining and integrating element 350 may encompass mixed-signal implementations of arithmetic combining and integration functionality. For example, the analog (bias) control loops described above may be replaced by a mixed signal control loop utilizing ADCs, DACs and digital logic, possibly including software. In some such examples, the LO detector output is sensed with an analog-to-digital converter (ADC) and all subsequent mathematical operations are performed using digital circuits or software, firmware, etc. For example, the matrix coefficients and operations (e.g., [αII αIQ, αQI αQQ][xI xQ]) may be stored and applied using digital computations and circuitry and/or software. Storage and computation may be performed by the data processor 210, for example (e.g., by the memory 298 and processor 296), by a controller (not illustrated) in the transceiver 220, or a combination of both. Other ways of calculating or determining yI, yQ, yI_bar, yQ_bar, and/or other forms of bias may additionally or alternatively be implemented. The bias control may be applied to the mixers 312, 322 (e.g., through respective pairs of termination resistances) using a digital-to-analog converter (DAC) to convert the digitally computed values to (DC) bias voltages.

Figure 9:
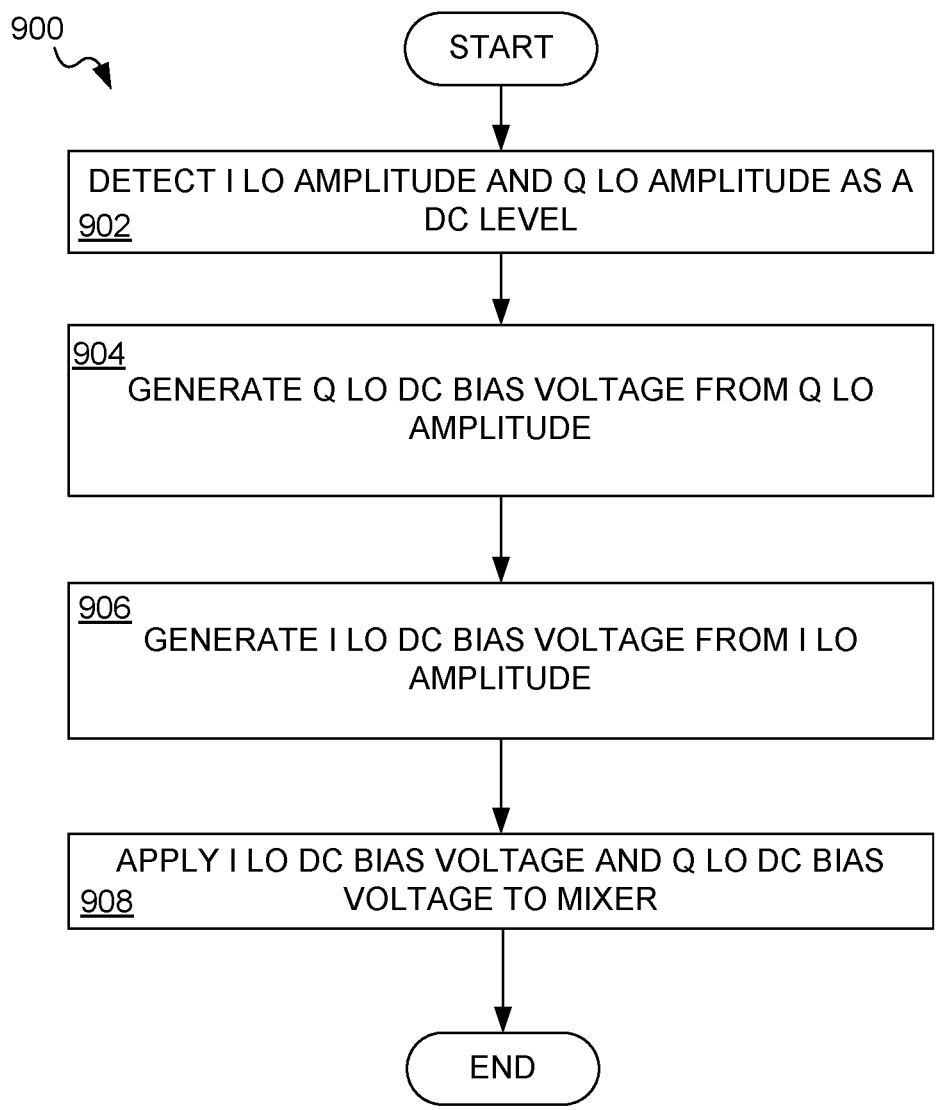
FIG. 9 is a flow chart describing an example of the operation of a method for mixing signals.

FIG. 9 is a flow chart 900 describing an example of the operation of a method for mixing signals. The blocks in the method 900 can be performed in or out of the order shown, and in some embodiments, can be performed at least in part in parallel.

In block 902, the Q LO amplitude and the I LO amplitude are detected. For example, the Q LO amplitude detect circuit 330 detects the amplitude of the quadrature LO signal as a DC level (xQ) and the I LO amplitude detect circuit 340 detects the amplitude of the in phase LO signal as a DC level (xI).

In block 904, a Q LO DC bias voltage is generated. For example, the arithmetic combination and integration element 350 generates a Q LO DC bias voltage from the Q LO amplitude only. This may be accomplished by the coefficients in the matrix shown in FIG. 3 being represented by $\alpha_{II}=\alpha_{QQ}=1$, and $\alpha_{IQ}=\alpha_{QI}=0$.

In block 906, an I LO DC bias voltage is generated. For example, the arithmetic combination element 350 generates an I LO DC bias voltage from the Q LO amplitude only. This may be accomplished by the coefficients in the matrix shown in FIG. 3 being represented by $\alpha_{II}=\alpha_{QQ}=1$, and $\alpha_{IQ}=\alpha_{QI}=0$.

In block 908, the I LO DC bias voltage and the Q LO DC bias voltage are applied to the mixer to improve the IRR of the mixer. For example, an output of the amplifier 422 is provided over connection 423 to the node 366 (FIG. 3) and forms the output, yQ_bar. Similarly, a yI_bar output is provided to the mixer 322.

Figure 10:
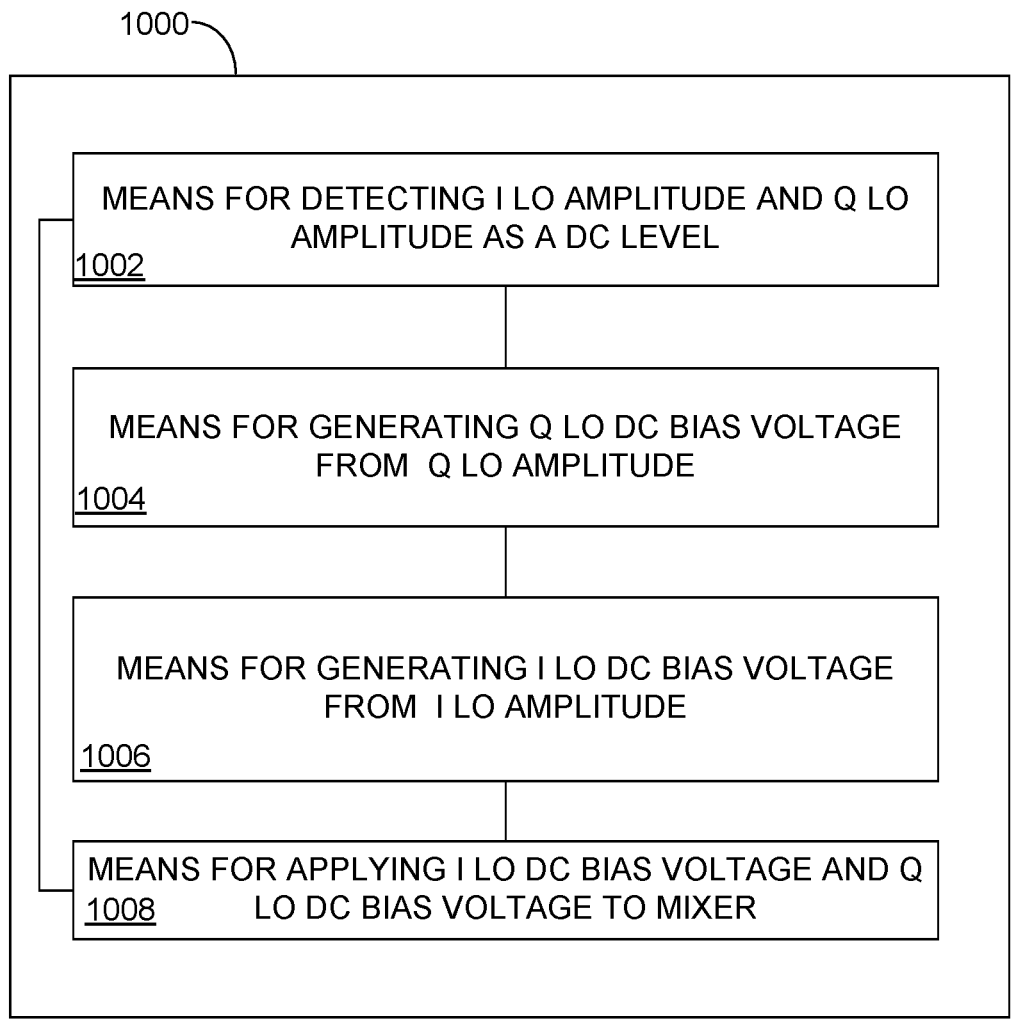
FIG. 10 is a functional block diagram of an apparatus for mixing signals.

FIG. 10 is a functional block diagram of an apparatus 1000 for mixing signals. The apparatus 1000 comprises means 1002 for detecting the I LO amplitude and the Q LO amplitude. In certain embodiments, the means 1002 for detecting the I LO amplitude and the Q LO amplitude can be configured to perform one or more of the functions described in operation block 902 of method 900 (FIG. 9). In an exemplary embodiment, the means 1002 for detecting the I LO amplitude and the Q LO amplitude may comprise the Q LO amplitude detect circuit 330 detecting the amplitude of the quadrature LO signal as a DC level (xQ) and the I LO amplitude detect circuit 340 detecting the amplitude of the in phase LO signal as a DC level (xI).

The apparatus 1000 may also comprise means 1004 for generating a Q LO DC bias voltage. In certain embodiments, the means 1004 for generating a Q LO DC bias voltage can be configured to perform one or more of the functions described in operation block 904 of method 900 (FIG. 9). In an exemplary embodiment, the means 1004 for generating a Q LO DC bias voltage may comprise the arithmetic combination and integration element 350 generating a Q LO DC bias voltage from the Q LO amplitude only. This may be accomplished by the coefficients in the matrix shown in FIG. 3 being represented by αII=αQQ=1, and αIQ=αQI=0.

The apparatus 1000 may also comprise means 1006 for generating an I LO DC bias voltage. In certain embodiments, the means 1006 for generating an I LO DC bias voltage can be configured to perform one or more of the functions described in operation block 906 of method 900 (FIG. 9). In an exemplary embodiment, the means 1006 for generating an I LO DC bias voltage may comprise the arithmetic combination element 350 generating an I LO DC bias voltage from the I LO amplitude only. This may be accomplished by the coefficients in the matrix shown in FIG. 3 being represented by $\alpha II=\alpha QQ=1$, and $\alpha IQ=\alpha QI=0$.

The apparatus 1000 may also comprise means 1008 for applying the I LO DC bias voltage and the Q LO DC bias voltage to the mixer to improve the IRR of the mixer. In certain embodiments, the means 1008 for applying the I LO DC bias voltage and the Q LO DC bias voltage to the mixer to improve the IRR of the mixer can be configured to perform one or more of the functions described in operation block 908 of method 900 (FIG. 9). In an exemplary embodiment, the means 1008 for applying the I LO DC bias voltage and the Q LO DC bias voltage to the mixer to improve the IRR of the mixer may comprise providing an output of the amplifier 422 over connection 423 to the node 366 (FIG. 3) and forming the output, yQ_bar. Similarly, a yI_bar output is provided to the mixer 322.

Figure 11:
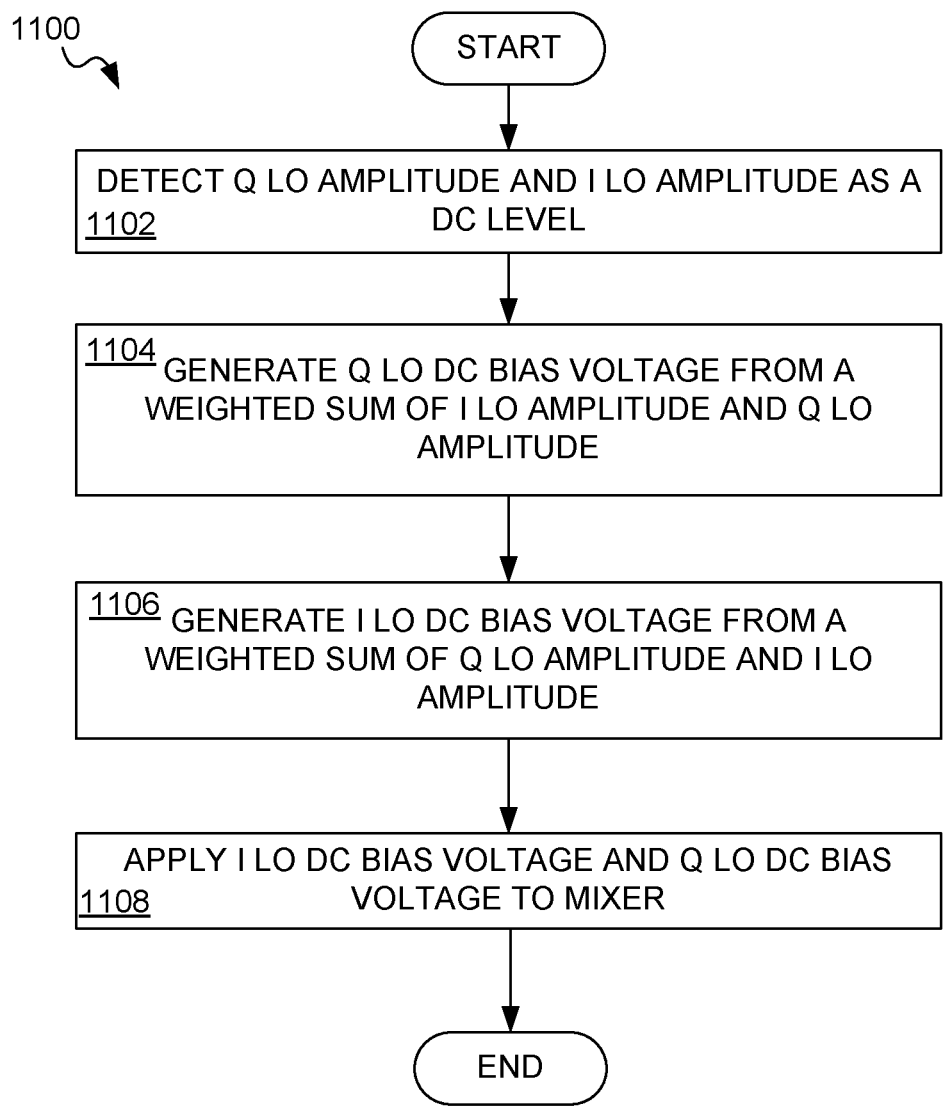
FIG. 11 is a flow chart describing an example of the operation of a method for mixing signals.

FIG. 11 is a flow chart 1100 describing an example of the operation of a method for mixing signals. The blocks in the method 1100 can be performed in or out of the order shown, and in some embodiments, can be performed at least in part in parallel.

In block 1102, the Q LO amplitude and the I LO amplitude are detected. For example, the Q LO amplitude detect circuit 330 detects the amplitude of the quadrature LO signal as a DC level (xQ) and the I LO amplitude detect circuit 340 detects the amplitude of the in phase LO signal as a DC level (xI).

In block 1104, a Q LO DC bias voltage is generated. For example, the arithmetic combination and integration element 350 generates a Q LO DC bias voltage from a weighted sum of I (xI) and Q (xQ) LO amplitude voltages. In a matrix form, this can be represented by $yQ=\alpha QI\ xI+\alpha QQ\ xQ$.

In block 1106, an I LO DC bias voltage is generated. For example, the arithmetic combination element 350 generates an I LO DC bias voltage from a weighted sum of Q (xQ) and I (xI) LO amplitude voltages. In a matrix form, this is represented by $yI=\alpha II\ xI+\alpha IQ\ xQ$. In other example methods, the IQ and QI weights are zero and the I LO and Q LO DC bias voltages may be calculated independently.

In block 1108, the I LO DC bias voltage and the Q LO DC bias voltage are applied to the mixer, for example to improve the IRR of the mixer. For example, an output of the amplifier 422 is provided over connection 423 to the node 366 (FIG. 3) and forms the output, yQ_bar. Similarly, a yI_bar output is provided to the mixer 322.

Figure 12:
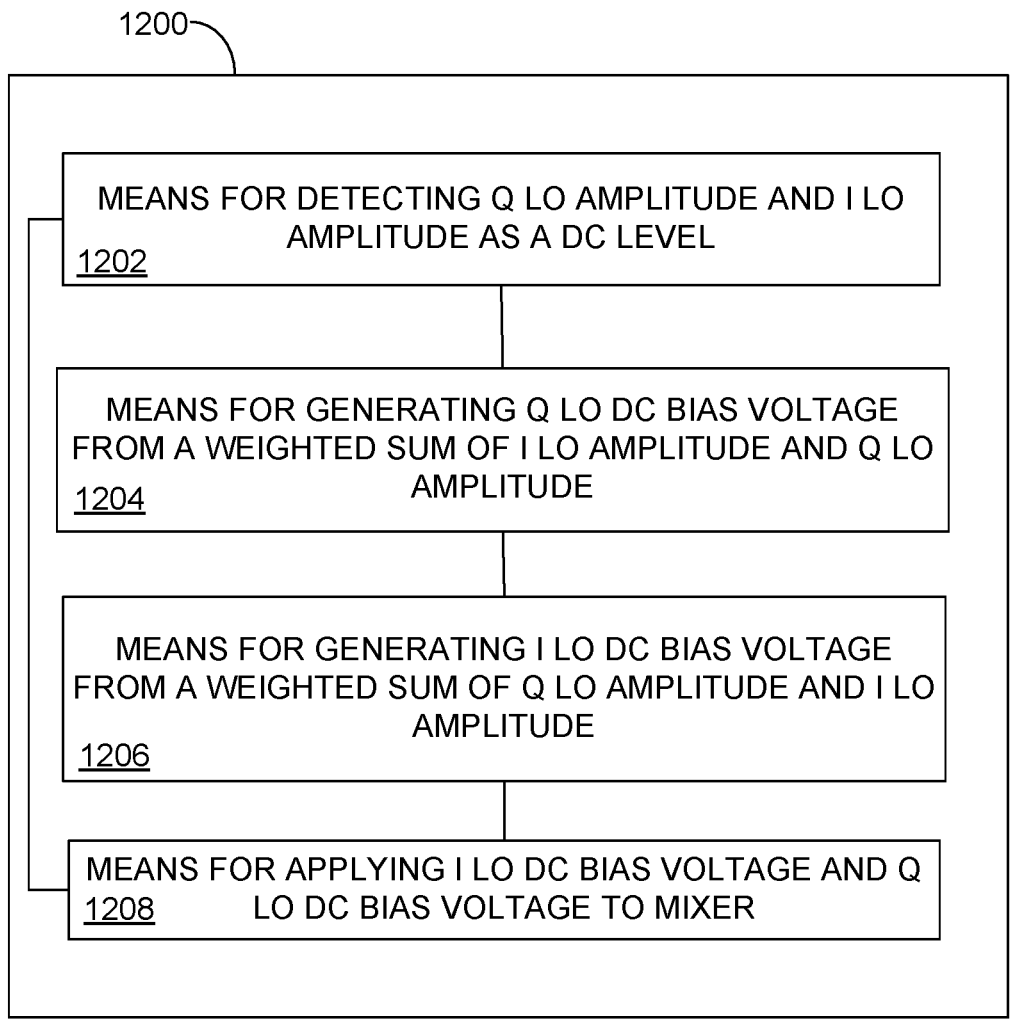
FIG. 12 is a functional block diagram of an apparatus for mixing signals.

FIG. 12 is a functional block diagram of an apparatus 1200 for mixing signals. The apparatus 1200 comprises means 1202 for detecting the Q LO amplitude and the I LO amplitude. In certain embodiments, the means 1202 for detecting the Q LO amplitude and the I LO amplitude can be configured to perform one or more of the functions described in operation block 1102 of method 1100 (FIG. 11). In an exemplary embodiment, the means 1202 for detecting the Q LO amplitude and the I LO amplitude may comprise the Q LO amplitude detect circuit 330 configured to detect the amplitude of the quadrature LO signal as a DC level (xQ) and the I LO amplitude detect circuit 340 configured to detect the amplitude of the in phase LO signal as a DC level (xI).

The apparatus 1200 may also comprise means 1204 for generating a Q LO DC bias voltage. In certain embodiments, the means 1204 for generating a Q LO DC bias voltage can be configured to perform one or more of the functions described in operation block 1104 of method 1100 (FIG. 11).

In an exemplary embodiment, the means 1204 for generating a Q LO DC bias voltage may comprise the arithmetic combination and integration element 350 configured to generate a Q LO DC bias voltage from a weighted sum of I (xI) and Q (xQ) LO amplitude voltages. In a matrix form, this is represented by $yQ=\alpha QI\ xI+\alpha QQ\ xQ$.

The apparatus 1200 may also comprise means 1206 for generating an I LO DC bias voltage. In certain embodiments, the means 1206 for generating an I LO DC bias voltage can be configured to perform one or more of the functions described in operation block 1106 of method 1100 (FIG. 11). In an exemplary embodiment, the means 1206 for generating an I LO DC bias voltage may comprise the arithmetic combination element 350 configured to generate an I LO DC bias voltage from a weighted sum of Q (xQ) and I (xI) LO amplitude voltages. In a matrix form, this is represented by $yI=\alpha II\ xI+\alpha IQ\ xQ$. In other example apparatus, the IQ and QI weights are zero and the I LO and Q LO DC bias voltages may be calculated independently, for example by separate means or in independent bias loops in common means.

The apparatus 1200 may also comprise means 1208 for applying the I LO DC bias voltage and the Q LO DC bias voltage to the mixer, for example to improve the IRR of the mixer. In certain embodiments, the means 1208 for applying the I LO DC bias voltage and the Q LO DC bias voltage to the mixer to improve the IRR of the mixer can be configured to perform one or more of the functions described in operation block 1108 of method 1100 (FIG. 11). In an exemplary embodiment, the means 1208 for applying the I LO DC bias voltage and the Q LO DC bias voltage to the mixer may comprise the amplifier 422 configured to provide an output over connection 423 to the node 366 (FIG. 3) and forming the output, yQ_bar. Similarly, a yI_bar output is provided to the mixer 322.

Implementation examples are described in the following numbered clauses:

1. A communication system, comprising: a passive quadrature generator connected directly to an in phase (I) mixer and a quadrature (Q) mixer; an I LO amplitude detect circuit connected to the passive quadrature generator and connected to the I mixer, and a Q LO amplitude detect circuit connected to the passive quadrature generator and connected to the Q mixer, the I LO amplitude detect circuit configured to detect an I LO amplitude and the Q LO amplitude detect circuit configured to detect a Q LO amplitude; and a combining and integrating circuit configured to receive the detected I LO amplitude and the detected Q LO amplitude and generate an I LO DC bias voltage to bias the I mixer and a Q LO DC bias voltage to bias the Q mixer.

2. The communication system of clause 1, wherein the I LO DC bias voltage is a function of the I LO amplitude and not the Q LO amplitude, and the Q LO DC bias voltage is a function of the Q LO amplitude and not the I LO amplitude.

3. The communication system of clause 1 or 2, wherein the I LO DC bias voltage and Q LO DC bias voltage is a weighted sum of the I LO amplitude and Q LO amplitude.

4. The communication system of clause 3, wherein the I LO amplitude and Q LO amplitude are equally weighted.

5. The communication system of any of clauses 2 through 4, wherein the I LO DC bias voltage controls a current through the I mixer and the Q LO DC bias voltage controls a current through the Q mixer.

6. The communication system of any of clauses 2 through 5, wherein the I LO amplitude detect circuit comprises transistors that are replicas of switching transistors in the I mixer and the Q LO amplitude detect circuit comprises transistors that are replicas of switching transistors in the Q mixer.

7. The communication system of any of clauses 2 through 6, further comprising differential termination resistances in the I LO amplitude detect circuit and in the Q LO amplitude detect circuit, the differential termination resistances configured to allow direct connection of the I mixer and the Q mixer to the passive quadrature generator.

8. The communication system of clause 7, wherein the differential termination resistances have a value that is twice a characteristic impedance of the passive quadrature generator.

9. The communication system of any of clauses 2 through 8, wherein the I LO amplitude detect circuit and the Q LO amplitude detect circuit comprise a common mode sensing circuit.

10. The communication system of any of clauses 2 through 9, wherein the common mode sensing circuit comprises a resistive divider.

11. The communication system of any of clauses 2 through 10, wherein the I LO amplitude detect circuit comprises an independent bias loop for signals processed by the I mixer and the Q LO amplitude detect circuit comprises an independent bias loop for signals processed by the Q mixer.

12. The communication system of any of clauses 2 through 11, wherein the I mixer and the Q mixer are configured to process signals in one or more of a millimeter wave (mmW) communication band and a sub-teraHertz (THz) communication band.

13. The communication system of clause 12, wherein the I mixer and the Q mixer are configured to downconvert the mmW or the sub-THz frequency to baseband.

14. A method for mixing signals, comprising: detecting an in phase (I) LO amplitude and a quadrature (Q) LO amplitude; generating an I LO DC bias voltage from the I LO amplitude; generating a Q LO DC bias voltage from the Q LO amplitude; and
applying the I LO DC bias voltage to an I mixer and applying the Q LO DC bias voltage to a Q mixer to improve the image rejection ratio (IRR) of the I mixer and the Q mixer.

15. The method of clause 14, wherein the I LO DC bias voltage is not generated based on the Q LO amplitude, and the Q LO DC bias voltage is not generated based on the I LO amplitude.

16. The method of clause 14 or 15, wherein the I LO DC bias voltage and Q LO DC bias voltage is a weighted sum of the I LO amplitude and Q LO amplitude.

17. The method of clause 16, wherein the I LO amplitude and Q LO amplitude are equally weighted.

18. The method of any of clauses 14 through 17, wherein applying the I LO DC bias voltage to the I mixer and applying the Q LO DC bias voltage to the Q mixer improves the I mixer's and Q mixer's rejection of local oscillator (LO) signal imbalance.

19. The method of any of clauses 14 through 18, wherein the I LO DC bias voltage and the Q LO DC bias voltages are generated using an independent bias loops.

20. The method of any of clauses 14 through 19, further comprising processing signals in one or more of a millimeter wave (mmW) communication band and a sub-teraHertz (THz) communication band using the I mixer and Q mixer.

21. The method of clause 20, wherein the processing comprises downconverting I mixer signals and Q mixer signals to baseband.

22. A device for signal mixing, comprising: means for detecting an in phase (I) LO amplitude and a quadrature (Q) LO amplitude; means for generating an I LO DC bias voltage from the I LO amplitude; means for generating a Q LO DC bias voltage from the Q LO amplitude; and means for applying the I LO DC bias voltage to an I mixer and means for applying the Q LO DC bias voltage to a Q mixer to improve the image rejection ratio (IRR) of the mixer.

23. The device of clause 22, wherein the I LO DC bias voltage is not a function of the Q LO amplitude and the Q LO DC bias voltage is not a function of the I LO amplitude.

24. The device of clause 22 or 23, wherein the I LO DC bias voltage and Q LO DC bias voltage is a weighted sum of the I LO amplitude and Q LO amplitude.

25. The device of clause 24, wherein the I LO amplitude and Q LO amplitude are equally weighted.

26. The device of any of clauses 22 through 25, wherein the means for applying the I LO DC bias voltage to the I mixer and applying the Q LO DC bias voltage to the Q mixer improves the I mixer's and Q mixer's rejection of local oscillator (LO) signal imbalance.

27. The device of any of clauses 22 through 26, further comprising means for processing I mixer signals using an independent I bias loop and processing Q mixer signals using an independent Q bias loop.

28. The device of any of clauses 22 through 27, further comprising means for processing I mixer signals and Q mixer signals in one or more of a millimeter wave (mmW) communication band and a sub-teraHertz (THz) communication band.

29. The device of clause 28, further comprising means for downconverting the I mixer signals and Q mixer signals to baseband.

The circuit architecture described herein described herein may be implemented on one or more ICs, analog ICs, RFICs, mixed-signal ICs, ASICs, printed circuit boards (PCBs), electronic devices, etc. The circuit architecture described herein may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the circuit described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

Although selected aspects have been illustrated and described in detail, it will be understood that various substitutions and alterations may be made therein without departing from the spirit and scope of the present invention, as defined by the following claims.

What is claimed is:

1. A communication system, comprising:
a passive quadrature generator connected directly to an in phase (I) mixer and a quadrature (Q) mixer;
an I LO amplitude detect circuit connected to the passive quadrature generator and connected to the I mixer, and a Q LO amplitude detect circuit connected to the passive quadrature generator and connected to the Q mixer, the I LO amplitude detect circuit configured to detect an I LO amplitude and the Q LO amplitude detect circuit configured to detect a Q LO amplitude; and
a combining and integrating circuit configured to receive the detected I LO amplitude and the detected Q LO amplitude and generate an I LO DC bias voltage to bias the I mixer and a Q LO DC bias voltage to bias the Q mixer.

2. The communication system of claim 1, wherein the I LO DC bias voltage is a function of the I LO amplitude and not the Q LO amplitude, and the Q LO DC bias voltage is a function of the Q LO amplitude and not the I LO amplitude.

3. The communication system of claim 1, wherein the I LO DC bias voltage and Q LO DC bias voltage is a weighted sum of the I LO amplitude and Q LO amplitude.

4. The communication system of claim 3, wherein the I LO amplitude and Q LO amplitude are equally weighted.

5. The communication system of claim 1, wherein the I LO DC bias voltage controls a current through the I mixer and the Q LO DC bias voltage controls a current through the Q mixer.

6. The communication system of claim 1, wherein the I LO amplitude detect circuit comprises transistors that are replicas of switching transistors in the I mixer and the Q LO amplitude detect circuit comprises transistors that are replicas of switching transistors in the Q mixer.

7. The communication system of claim 1, further comprising differential termination resistances in the I LO amplitude detect circuit and in the Q LO amplitude detect circuit, the differential termination resistances configured to allow direct connection of the I mixer and the Q mixer to the passive quadrature generator.

8. The communication system of claim 7, wherein the differential termination resistances have a value that is twice a characteristic impedance of the passive quadrature generator.

9. The communication system of claim 1, wherein the I LO amplitude detect circuit and the Q LO amplitude detect circuit comprise a common mode sensing circuit.

10. The communication system of claim 9, wherein the common mode sensing circuit comprises a resistive divider.

11. The communication system of claim 1, wherein the I LO amplitude detect circuit comprises an independent bias loop for signals processed by the I mixer and the Q LO amplitude detect circuit comprises an independent bias loop for signals processed by the Q mixer.

12. The communication system of claim 1, wherein the I mixer and the Q mixer are configured to process signals in one or more of a millimeter wave (mmW) communication band and a sub-teraHertz (THz) communication band.

13. The communication system of claim 12, wherein the I mixer and the Q mixer are configured to downconvert the mmW or the sub-THz frequency to baseband.

14. A method for mixing signals, comprising:
detecting an in phase (I) LO amplitude and a quadrature (Q) LO amplitude;
generating an I LO DC bias voltage from the I LO amplitude;
generating a Q LO DC bias voltage from the Q LO amplitude; and
applying the I LO DC bias voltage to an I mixer and applying the Q LO DC bias voltage to a Q mixer to improve the image rejection ratio (IRR) of the I mixer and the Q mixer.

15. The method of claim 14, wherein the I LO DC bias voltage is not generated based on the Q LO amplitude, and the Q LO DC bias voltage is not generated based on the I LO amplitude.

16. The method of claim 14, wherein the I LO DC bias voltage and Q LO DC bias voltage is a weighted sum of the I LO amplitude and Q LO amplitude.

17. The method of claim 16, wherein the I LO amplitude and Q LO amplitude are equally weighted.

18. The method of claim 14, wherein applying the I LO DC bias voltage to the I mixer and applying the Q LO DC bias voltage to the Q mixer improves the I mixer's and Q mixer's rejection of local oscillator (LO) signal imbalance.

19. The method of claim 14, wherein the I LO DC bias voltage and the Q LO DC bias voltages are generated using an independent bias loops.

20. The method of claim 14, further comprising processing signals in one or more of a millimeter wave (mmW) communication band and a sub-teraHertz (THz) communication band using the I mixer and Q mixer.

21. The method of claim 20, wherein the processing comprises downconverting I mixer signals and Q mixer signals to baseband.

22. A device for signal mixing, comprising:
means for detecting an in phase (I) LO amplitude and a quadrature (Q) LO amplitude;
means for generating an I LO DC bias voltage from the I LO amplitude;
means for generating a Q LO DC bias voltage from the Q LO amplitude; and
means for applying the I LO DC bias voltage to an I mixer and means for applying the Q LO DC bias voltage to a Q mixer to improve the image rejection ratio (IRR) of the mixer.

23. The device of claim 22, wherein the I LO DC bias voltage is not a function of the Q LO amplitude and the Q LO DC bias voltage is not a function of the I LO amplitude.

24. The device of claim 22, wherein the I LO DC bias voltage and Q LO DC bias voltage is a weighted sum of the I LO amplitude and Q LO amplitude.

25. The device of claim 24, wherein the I LO amplitude and Q LO amplitude are equally weighted.

26. The device of claim 22, wherein the means for applying the I LO DC bias voltage to the I mixer and applying the Q LO DC bias voltage to the Q mixer improves the I mixer's and Q mixer's rejection of local oscillator (LO) signal imbalance.

27. The device of claim 22, further comprising means for processing I mixer signals using an independent I bias loop and processing Q mixer signals using an independent Q bias loop.

28. The device of claim 22, further comprising means for processing I mixer signals and Q mixer signals in one or more of a millimeter wave (mmW) communication band and a sub-teraHertz (THz) communication band.

29. The device of claim 28, further comprising means for downconverting the I mixer signals and Q mixer signals to baseband.

\* \* \* \* \*